US012252208B2

(12) United States Patent
Samson et al.

(10) Patent No.: US 12,252,208 B2
(45) Date of Patent: Mar. 18, 2025

(54) DEVICE FOR ATTACHING AN ANIMAL CARRIER TO A BICYCLE

(71) Applicant: BUDDY VENTURES INTERNATIONAL LTD., Williams Lake (CA)

(72) Inventors: Barry Jonas Samson, Nanaimo (CA); Colin Catton, Parksville (CA); Matthew John Edwards, Whitby (CA)

(73) Assignee: BUDDY VENTURES INTERNATIONAL LTD., Williams Lake (CA)

( * ) Notice: Subject to any disclaimer, the term of this patent is extended or adjusted under 35 U.S.C. 154(b) by 0 days.

(21) Appl. No.: 18/617,545

(22) Filed: Mar. 26, 2024

(65) Prior Publication Data
US 2024/0308610 A1    Sep. 19, 2024

Related U.S. Application Data

(63) Continuation of application No. PCT/CA2023/051506, filed on Nov. 10, 2023.
(Continued)

(30) Foreign Application Priority Data

Nov. 10, 2023  (WO) ................ PCT/CA2023/051506

(51) Int. Cl.
*B62J 9/27* (2020.01)
(52) U.S. Cl.
CPC ...................................... *B62J 9/27* (2020.02)

(58) Field of Classification Search
CPC ......... A01K 1/0281; B62J 1/165; B62J 1/167; B62J 1/28; B62J 11/00; B62J 7/04; B62J 9/21; B62J 9/23; B62J 9/26; B62J 9/27
(Continued)

(56) References Cited

U.S. PATENT DOCUMENTS 2,354,881 A * 8/1944 Rehn ..................... B62J 1/167
297/211
3,625,405 A * 12/1971 Kezar ..................... B62J 1/28
224/450
(Continued)

FOREIGN PATENT DOCUMENTS

| CA | 2340537 | 9/2001 |
| CA | 2509602 | 12/2005 |

(Continued)

OTHER PUBLICATIONS

CN-203186492-U Translation, Cai J, Sep. 11, 2013, (Year: 2013).*
(Continued)

*Primary Examiner* — Nathan J Newhouse
*Assistant Examiner* — Matthew T Theis
(74) *Attorney, Agent, or Firm* — Meister Seelig & Fein PLLC

(57) ABSTRACT

A device attaches an animal carrier to a bicycle. The device includes an adjustable arm having a first end and a second end. The adjustable arm includes a bicycle coupling at the first end, for securing the arm to the bicycle. The adjustable arm further includes a carrier mount at the second end, for mounting the animal carrier to the arm. The arm is adjustable such that the carrier mount is rotatable relative to the bicycle coupling.

23 Claims, 38 Drawing Sheets

Related U.S. Application Data

(60) Provisional application No. 63/429,685, filed on Dec. 2, 2022.

(58) Field of Classification Search
USPC .......................................................... 224/425
See application file for complete search history.

(56) References Cited

U.S. PATENT DOCUMENTS

| | | | |
|---|---|---|---|
| 4,919,479 | A | 4/1990 | Loewke |
| 5,845,830 | A | 12/1998 | Dreiling |
| 6,179,183 | B1 | 1/2001 | Kloster |
| 7,174,852 | B2 * | 2/2007 | Jefferson .................. B62J 1/167 |
| | | | 280/304.5 |
| 7,523,986 | B2 * | 4/2009 | Jefferson .................. B62J 1/167 |
| | | | 297/243 |
| 10,597,102 | B2 | 3/2020 | Cheng |
| 10,814,929 | B2 | 10/2020 | Provost |
| 2004/0061361 | A1 * | 4/2004 | Jefferson .................. B62J 1/167 |
| | | | 297/195.13 |
| 2005/0001460 | A1 | 1/2005 | Starodoj |

FOREIGN PATENT DOCUMENTS

| | | | |
|---|---|---|---|
| CN | 203186492 U | * | 9/2013 |
| CN | 104369806 | | 2/2015 |
| KR | 20160074372 A | * | 6/2016 |
| KR | 102062510 | | 1/2020 |

OTHER PUBLICATIONS

KR-20160074372-A Translation, Kim, Jun. 28, 2016 (Year: 2016).*
"BuddyRider," webpage < https://buddyrider.ca/>, 5 pages, Feb. 28, 2022, retrieved from Internet Archive Wayback Machine < https://web.archive.org/web/20220517101918/https://buddyrider.ca/> date stamped on May 17, 2022.

* cited by examiner

DEVICE FOR ATTACHING AN ANIMAL CARRIER TO A BICYCLE

FIELD

The present disclosure relates to bicycle attachments and in particular to a device for attaching an animal carrier to a bicycle.

BACKGROUND

While on the go, humans may wish to travel with their pets instead of leaving them at home. In particular, it may be desirable for a human riding a bicycle to travel with their pet, such as their dog. Allowing the pet to experience the bicycle ride with their owner may be beneficial for the pet as well as the owner.

Various solutions have been developed for enabling pets to travel with their owners when riding a bicycle. For example, the pet may be placed in a chariot that is secured to the bicycle and that is towed by the owner during the ride. While such solutions have their benefits, they also suffer from the drawback, for example, that the pet's field of view is restricted during the ride.

Another way of allowing a pet to travel alongside their owner when riding a bicycle is to use an animal carrier that is secured to the bicycle's seat post, with the animal carrier positioned forward of the rider. This setup has the benefit that the pet has a largely unrestricted field of view during the ride.

However, since humans come in all shapes and sizes, as do animals, it can be difficult, depending on the particular physical characteristics of rider and the pet, for such an animal carrier to be appropriately positioned relative to the bicycle without interfering with the rider's pedaling or safety.

SUMMARY

According to a first aspect of the disclosure, there is provided a device for attaching an animal carrier to a bicycle, comprising: an adjustable arm having a first end and a second end, the adjustable arm comprising: a bicycle coupling at the first end, for securing the arm to the bicycle; and a carrier mount at the second end, for mounting the animal carrier to the arm, wherein the arm is adjustable such that the carrier mount is rotatable relative to the bicycle coupling.

The arm may further comprise interconnected arm portions extending between the first and second ends of the arm, and at least a first arm portion of the arm portions may be pivotally connected to at least a second arm portion of the arm portions.

At least a third arm portion of the arm portions may be pivotally connected to the second arm portion.

The first arm portion may be pivotally connected to the second arm portion via interlocking gears.

At least one of the arm portions may comprise a first portion extending in a first direction and a second portion extending in a second direction at a fixed angle relative to the first direction.

The carrier mount may be pivotally connected to one of the arm portions.

The arm may comprise a first arm portion and a second arm portion, each extending between the first and second ends of the arm, and the first arm portion may extend in a first direction and the second arm portion may extend in a second direction at a fixed angle relative to the first direction.

The bicycle coupling may comprise a clamp for clamping the arm to a seat tube of the bicycle.

The bicycle coupling may comprise: a first attachment for attaching the bicycle coupling to a seat tube of the bicycle; and a second attachment for attaching the bicycle coupling to a top tube of the bicycle.

The first attachment may be positioned relative to the second attachment such that the first attachment is attachable below a seat clamp of the bicycle.

The first attachment may be positioned relative to the second attachment such that the first attachment is attachable above a seat clamp of the bicycle.

The first attachment may comprise a seat clamp of the bicycle.

The device may further comprise the animal carrier.

The animal carrier may comprise at a front thereof a recess for accommodating at least a portion of a stem of the bicycle.

The animal carrier may comprise a carrier base for securing to the carrier mount, and the carrier base and the carrier mount may be configured such that a position of the animal carrier relative to the carrier mount may be adjusted by up to 4 inches in a fore-aft direction and without the carrier mount protruding beyond edges of the carrier base.

The carrier base may comprise a set of first apertures formed therein, the carrier mount may comprise a set of second apertures formed therein, and the carrier base may be mountable to the carrier mount by aligning at least one of the first apertures with at least one of the second apertures and inserting a fastener through the aligned apertures.

The device may further comprise one or more spacers for securing between the carrier mount and the animal carrier so as to vertically space the animal carrier from a stem of the bicycle.

The device may further comprise a secondary arm having a first end and a second end and comprising: a secondary bicycle coupling at the first end of the secondary arm and configured to secure the secondary arm to the bicycle; and a secondary carrier mount at the second end of the secondary arm and configured to secure the secondary arm to at least one of: the carrier mount; the animal carrier; and the adjustable arm.

The secondary carrier mount at the second end of the secondary arm may be configured to secure the secondary arm to the adjustable arm or the animal carrier.

The secondary arm may further comprise interconnected secondary arm portions extending between the first and second ends of the secondary arm, and at least a first secondary arm portion of the secondary arm portions may be pivotally connected to at least a second secondary arm portion of the secondary arm portions.

The secondary bicycle coupling may be configured to secure the secondary arm to a top tube of the bicycle.

The secondary bicycle coupling may be configured to secure the secondary arm to a stem of the bicycle.

The device may further comprise the animal carrier, and the secondary carrier mount may comprise one or more apertures formed therein, and the secondary carrier mount may be attachable to the animal carrier by aligning at least one of the one or more apertures with at least one corresponding aperture formed in the animal carrier and inserting a fastener through the aligned apertures.

The adjustable arm may be extendable.

At least a portion of the adjustable arm may be telescopic.

According to a further aspect of the disclosure, there is provided a bicycle comprising, attached thereto, any of the above-described devices.

According to a further aspect of the disclosure, there is provided a kit of parts comprising: an animal carrier for carrying an animal; and an adjustable arm having a first end and a second end, the adjustable arm comprising: a bicycle coupling at the first end, for securing the arm to a bicycle; and a carrier mount at the second end, for mounting the animal carrier to the arm, wherein the arm is adjustable such that the carrier mount is rotatable relative to the bicycle coupling.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which.

DETAILED DESCRIPTION

Figure 1:
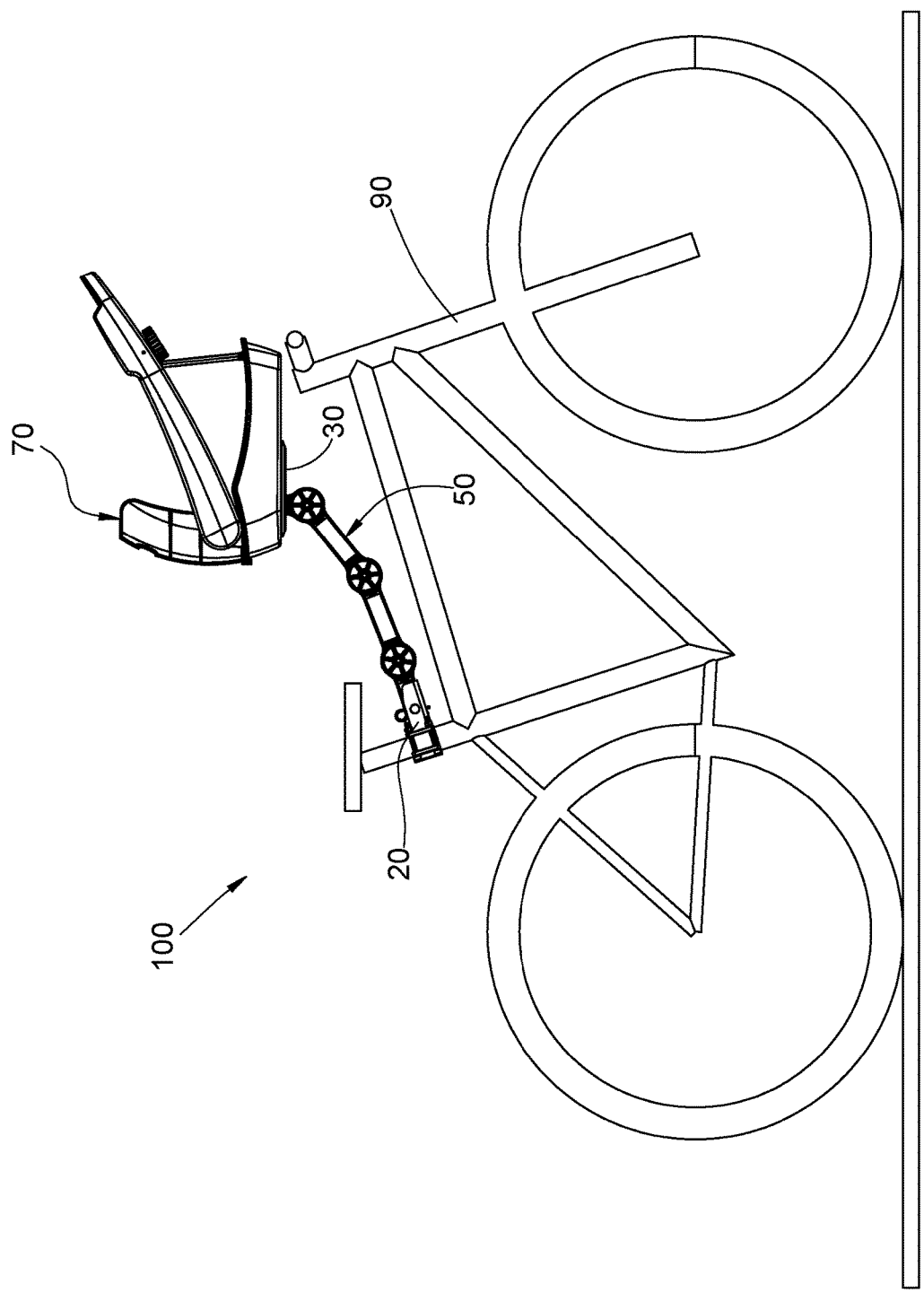
FIG. 1 shows a device ("adjustable carrier attachment") for attaching an animal carrier to a bicycle, with the device secured to the bicycle, according to an embodiment of the disclosure.

The present disclosure seeks to provide an improved device for attaching an animal carrier to a bicycle. While various embodiments of the disclosure are described below, the disclosure is not limited to these embodiments, and variations of these embodiments may well fall within the scope of the disclosure which is to be limited only by the appended claims.

Generally, according to embodiments of the disclosure, there is described a device (which may be referred to as an adjustable carrier attachment) for attaching an animal carrier to a bicycle. The adjustable carrier attachment comprises an adjustable arm having a first end and a second end. At the first end is located a bicycle coupling for securing the adjustable arm to the bicycle. At the second end is located a carrier mount for mounting the animal carrier to the adjustable arm. The arm is adjustable such that the carrier mount is rotatable relative to the bicycle coupling.

Therefore, when the animal carrier is mounted to the carrier mount, the angle of the animal carrier relative to the bicycle may be adjusted, and may therefore enable a relatively wider range of animal sizes and rider sizes to safely and efficiently use the adjustable carrier attachment, as described in further detail below.

The adjustable arm may take many different forms to thereby increase the degree of adjustability of the arm. For example, as described in further detail below, the arm may further include interconnected, articulating arm portions extending between the first and second ends of the arm. At least a first arm portion of the arm portions is pivotally connected to at least a second arm portion of the arm portions. Therefore, by providing multiple pivot points along the length of the arm, a greater degree of customizability may be provided when securing the animal carrier to the bicycle through use of the adjustable carrier attachment. In particular, the animal carrier may be positioned in a greater range of positions relative to the rider and the bicycle, and this may in turn allow a greater range of riders and pets to use the adjustable carrier attachment.

Further still, the animal carrier comprises a carrier base for securing to the carrier mount, and the carrier base and the carrier mount may be configured such that the animal carrier may be adjusted in the fore-aft direction by up to 4 inches relative to the carrier mount and without the carrier mount protruding beyond the edges of the carrier base. This may allow for an increased range of fore and aft adjustability of the animal carrier relative to the carrier mount while still ensuring that the carrier mount does not protrude beyond the edges of the carrier base (as otherwise this may pose a safety hazard to the rider).

As will become apparent from the disclosure, embodiments of the disclosure allow for a greater range of riders to use the adjustable animal carrier without the adjustable animal carrier interfering with their ability to safely ride the bicycle. In particular, without the adjustability that the adjustable animal carrier described herein provides, smaller riders on smaller bicycles may struggle to use an animal carrier since the handlebars on smaller bicycles tend to be too close to the seat post. Furthermore, smaller bicycle geometry tends to have the seat mounted too low relative to the zenith of the knee at the top of the pedal stroke. The adjustable animal carrier described herein may allow such riders to ride without having to splay apart their legs when pedaling, and without restricting the range of motion of the handlebars.

Furthermore, the adjustable carrier attachment described herein allows the position of the animal carrier to be fine-tuned, allowing for an optimal position for the pet to be achieved. This position may be, for example, one or more of the following: a) as near as possible to the rider's chest without impinging on the rider's vision; b) above the zenith of the rider's knee at the top of the pedal stroke; and c) above and at least partially forward of the handlebars so as not to restrain easy and safe steering. Such an optimal riding position may optimize the rider's experience and connection with their pet. The optimal position may be further driven by a) the size and shape of the rider, including the length of the rider's lower leg (foot-to-knee) and thickness of their thighs; b) the size and geometry of the bicycle frame; c) the configuration and range of movement of the handlebars; and d) the size of the pet and whether the pet is sitting up or laying down.

Turning to FIG. 1, there is shown an adjustable arm carrier attachment 100 secured to a bicycle 90 and having an animal carrier 70 mounted thereon, according to a first embodiment of the disclosure.

Adjustable carrier attachment 100 includes an adjustable arm 50 secured to a seat post 91 of bicycle 90. In particular, at a first end of adjustable arm 50 is provided a bicycle coupling 20 for securing adjustable arm 50 to seat post 91. At an opposite, second end of adjustable arm 50 is provided a carrier mount 30 to which is secured animal carrier 70. As can be seen, adjustable arm 50 comprises a number of interconnected, linear arm portions (described in more detail in FIG. 8), with each arm portion angled relative to each other arm portion, enabling adjustable arm 50 to adopt a variety of different configurations as described in further detail below.

Figure 2:
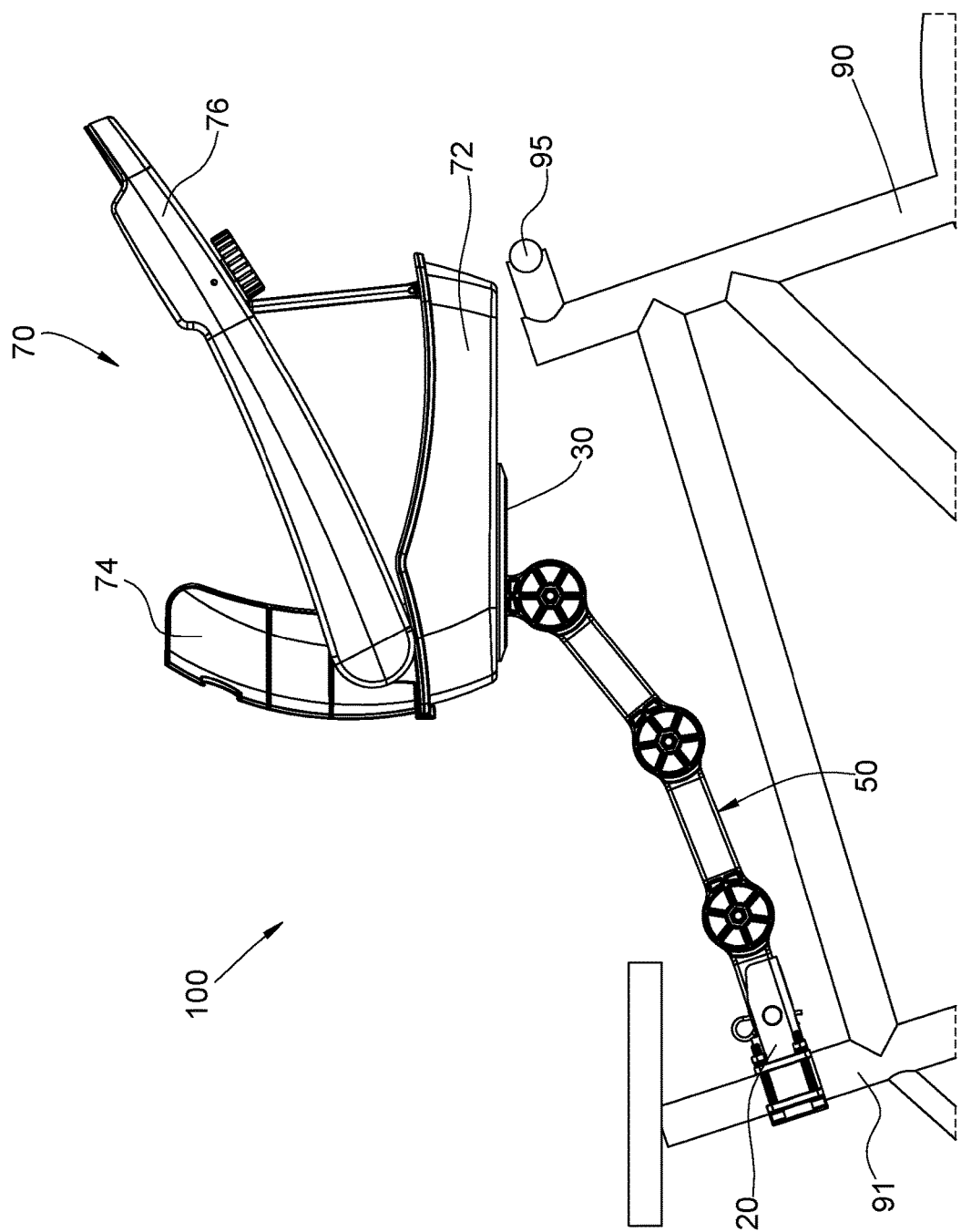
FIG. 2 is another view of the adjustable carrier attachment, animal carrier, and bicycle of FIG. 1, according to an embodiment of the disclosure.

Turning to FIG. 2, the features of FIG. 1 are shown in greater detail. Generally, animal carrier 70 comprises a carrier base 72, a carrier rear wall 74 extending upwardly from carrier base 72, and a paw deck 76. These components of animal carrier 70 are generally sized and configured to enable an animal, such as a domesticated dog or cat, to be placed in animal carrier 70 and transported therein during the riding of bicycle 90. While bicycle 90 is in motion, the animal may rest its paws on paw deck 76. Although not shown in FIG. 2, animal carrier 70 may additionally include a harness or other restraining device for securing the animal within animal carrier 70. The size of animal carrier 70 may vary depending on the size of the animal that is to be carried. For particularly large animals, a correspondingly large animal carrier may be used.

It shall be recognized that, while animal carrier 70 is designed for the transport of animals while bicycle 90 is being ridden, non-animal items may alternatively or additionally be transported within animal carrier 70. For example, the rider may opt to store their shopping within animal carrier 70.

Figure 3:
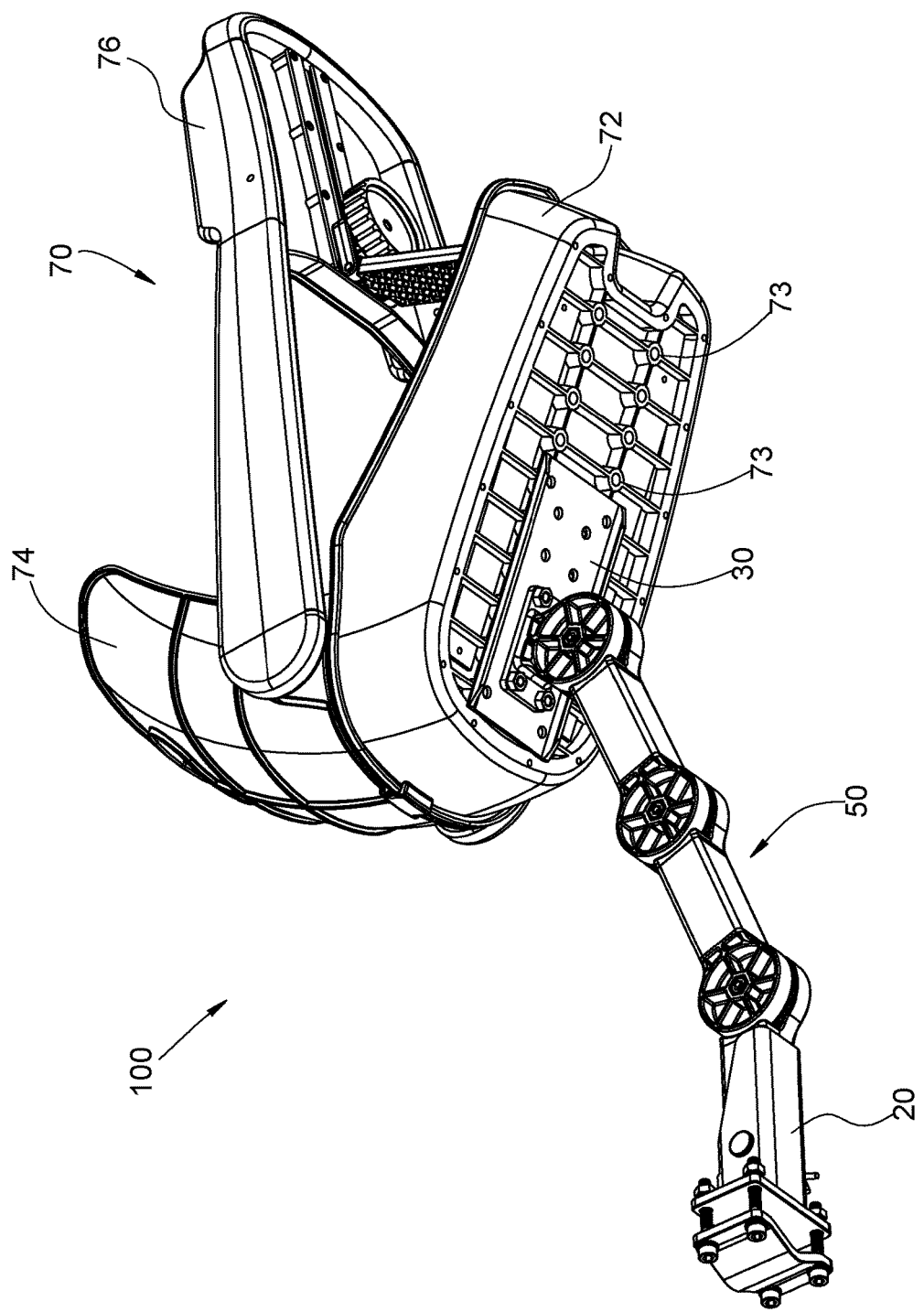
FIG. 3 shows an underside of the adjustable carrier attachment and animal carrier of FIG. 1, decoupled from the bicycle, according to an embodiment of the disclosure.
Figure 4:
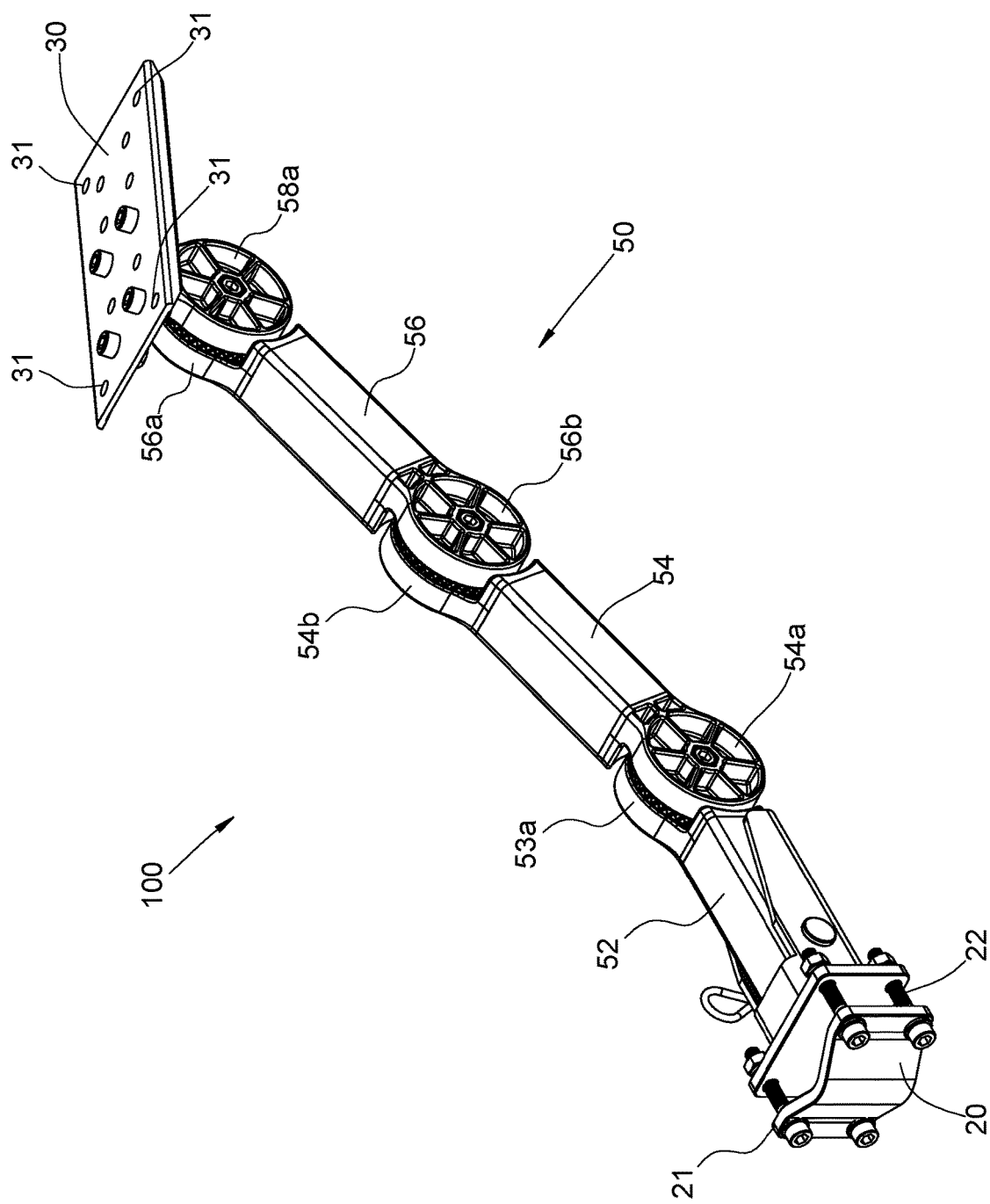
FIG. 4 shows the adjustable carrier attachment of FIG. 1 decoupled from the bicycle and the animal carrier, according to an embodiment of the disclosure.

FIG. 3 shows an underside of carrier base 72, with adjustable arm 50 decoupled from bicycle 90 for clarity. Carrier base 72 includes a pattern of base apertures 73 formed therein. According to the embodiment of FIG. 3, carrier base 72 includes twenty such base apertures 73. Base apertures 73 may be spaced apart by about 1 inch in the fore-aft direction, and by about 2 inches in the lateral direction (i.e. in the direction extending between the left and right sides of carrier base 72). As can be seen in FIG. 4, carrier mount 30 also includes a pattern of four mount apertures 31 formed therein. By aligning one or more of base apertures 73 with mount apertures 31, animal carrier 70 may be secured to carrier mount 30. Suitable fasteners such as bolts may be used to provide a strong connection between carrier base 72 and carrier mount 30, by threading the fasteners through the aligned apertures.

The respective sizes of carrier base 72 and carrier mount 30 are such that the position of animal carrier 70 relative to carrier mount 30 may be adjusted in the fore-aft direction. According to some embodiments, the degree of fore-aft adjustability is up to 4 inches without having carrier mount 30 extend beyond the edges of carrier base 72. Ensuring that carrier mount 30 does not extend beyond the edges of carrier base 72 provides a safety benefit since carrier mount 30 is typically manufactured from a hard metal and could therefore injure the rider if it protruded beyond the edges of carrier base 72

FIG. 4 shows adjustable arm 50, bicycle coupling 20, and carrier mount 30 in greater detail. Bicycle coupling 20 includes clamps 21 that may be brought together through the use of fasteners 22 for securing clamps 21 around seat post 91. As explained above, adjustable arm 50 includes a number of linear, interconnected and articulating arm portions 52, 54, 56, with each arm portion being angled relative to each other arm portion. In particular, adjustable arm 50 includes a first arm portion 52 connected to bicycle mount 20, a second arm portion 54 connected to first arm portion 52, and a third arm portion 56 connected to second arm portion 54 and carrier mount 30. The interconnection of each arm portion with each other arm portion is made by means of toothed or otherwise interlocking gears. In particular, first arm portion 52 includes a first gear 53a interlocked with a second gear 54a comprised in second arm portion 54. Second arm portion 54 further includes a third gear 54b interlocked with a fourth gear 56b comprised in third arm portion 56. Third arm portion 56 further includes a fifth gear 56a interlocked with a sixth gear 58a secured to carrier mount 30.

In each pair of interlocking gears, the gears may be rotated relative to one another. In particular, a fastening device such as a bolt that secures the gears to one another may first be withdrawn, the gears realigned, and the bolt re-inserted to fasten together the gears. Therefore, each arm portion 52, 54, 56 may be angled relative to, and may articulate relative to, each other arm portion as desired by the user.

It shall be understood that while the interconnection of arm portions 52, 54, 56 has been described in the context of interlocking gears, any other suitable means of rotating one arm portion relative to another arm portion may be used. Therefore, the disclosure is not limited to the use of interlocking gears for enabling the articulation of one arm portion relative to another arm portion, and other means of enabling articulation may be employed.

Figure 5:
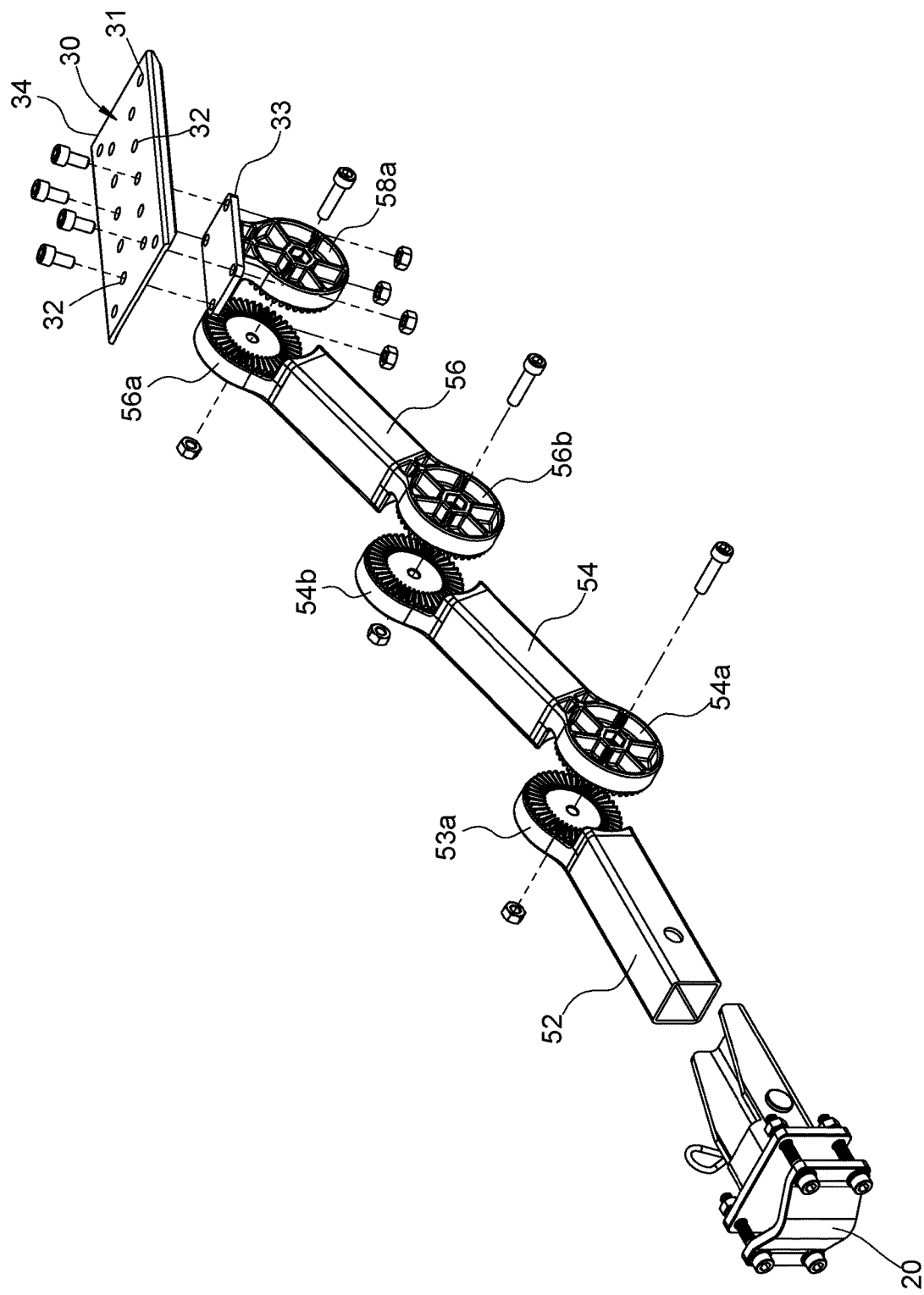
FIG. 5 shows constituent components of the adjustable carrier attachment of FIG. 1, according to an embodiment of the disclosure.

FIG. 5. shows the interconnection of the various components of FIG. 4 in greater detail. As can be seen, bolts and nuts (or other suitable fastening devices) may be used to secure a gear of each arm portion to a gear of another arm portion. Furthermore, carrier mount 30 is shown to include a first mount portion 33 coupled to sixth gear 58a, and a second, larger mount portion 34 with mount apertures 31 and mount apertures 32 formed therein. Second mount portion 34 is secured to first mount portion 33 using fasteners provided through mount apertures 32, whereas mount apertures 31 are used to secure mount portion 34 to carrier base 72, as already described in further detail above.

Figure 6:
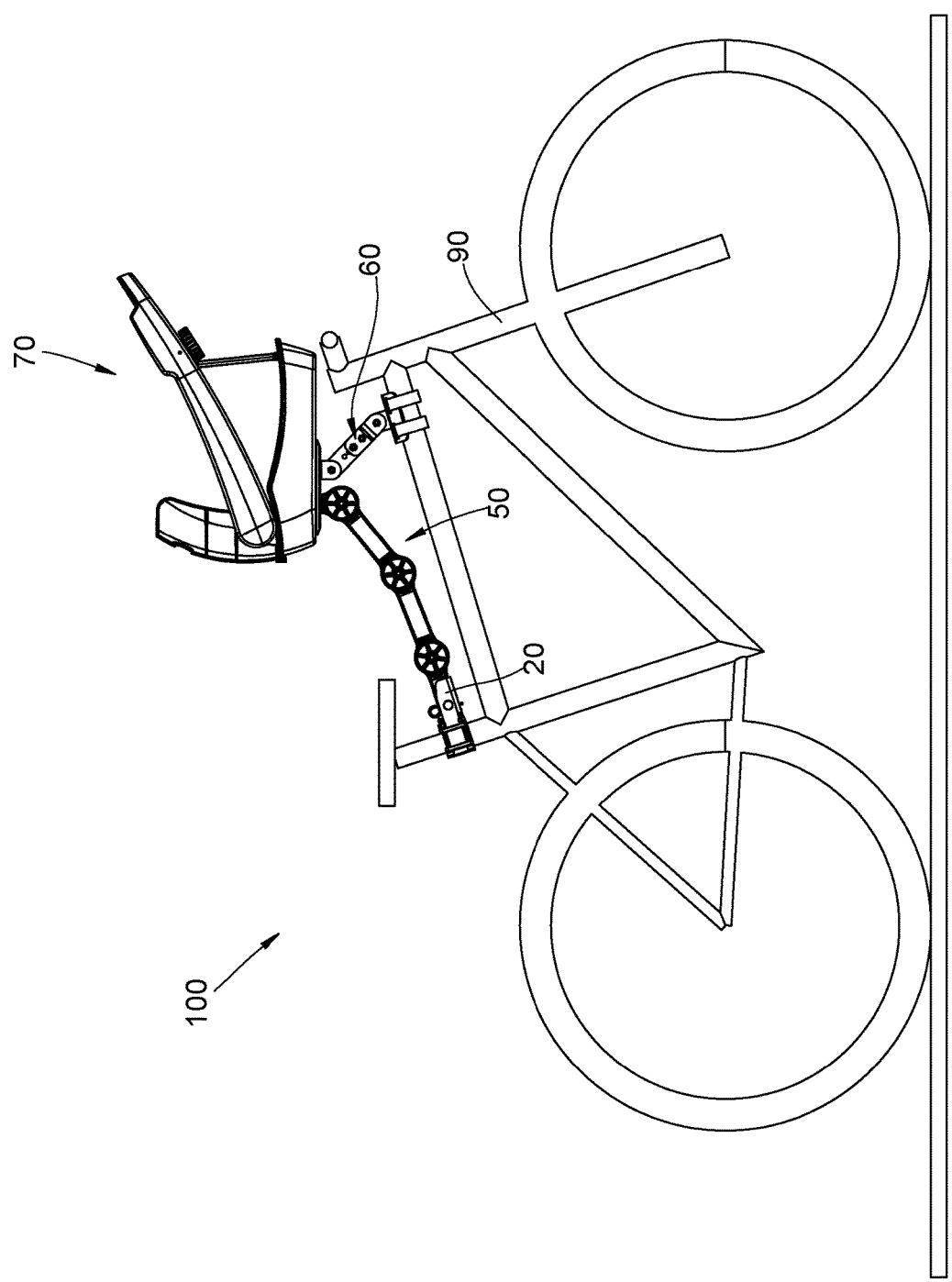
FIG. 6 shows a side-on view of the adjustable carrier attachment, animal carrier, and bicycle of FIG. 1, and including a secondary adjustable arm, according to an embodiment of the disclosure.
Figure 7:
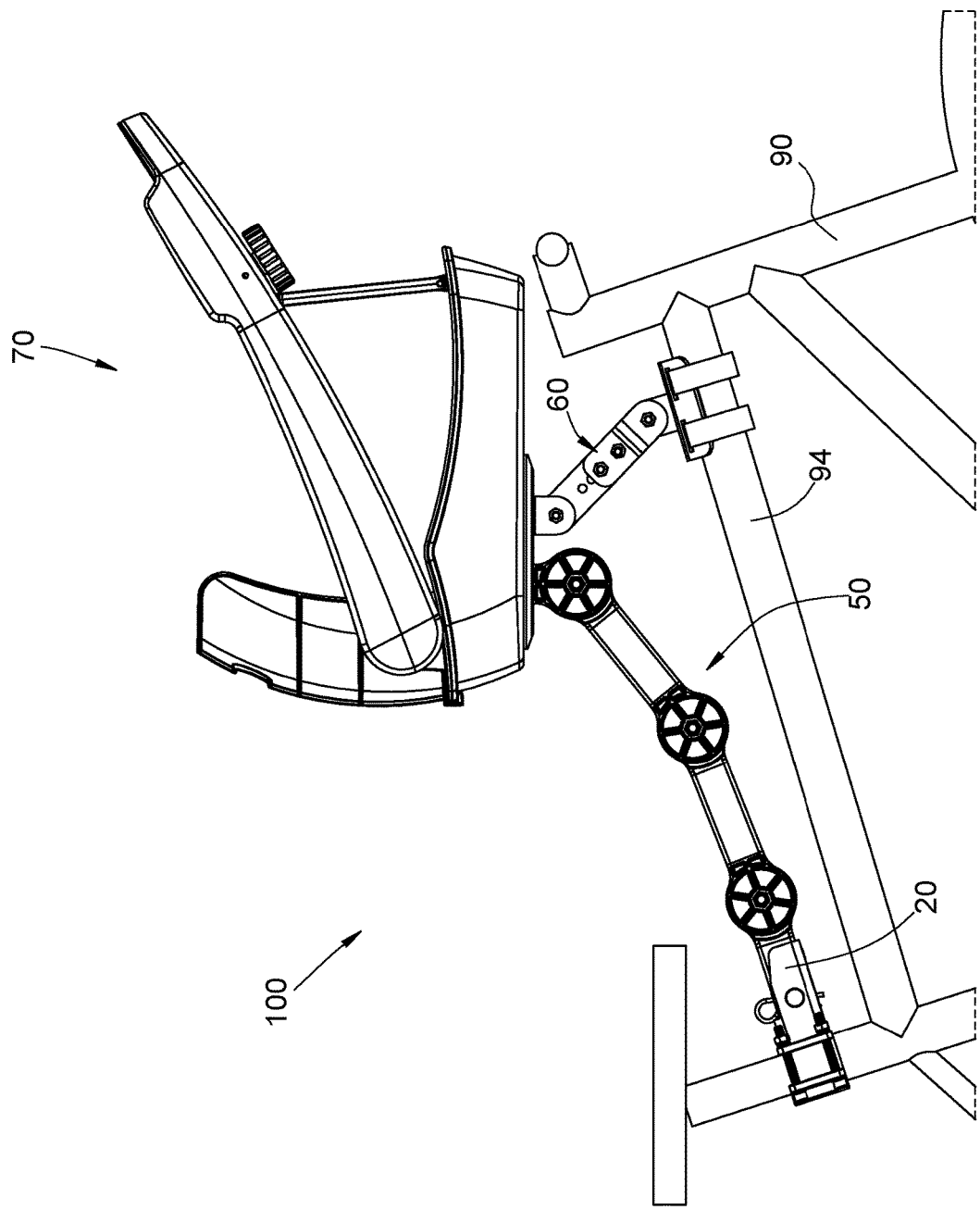
FIG. 7 shows another view of the adjustable carrier attachment, animal carrier, and bicycle of FIG. 1, and including a secondary adjustable arm, according to an embodiment of the disclosure.
Figure 9:
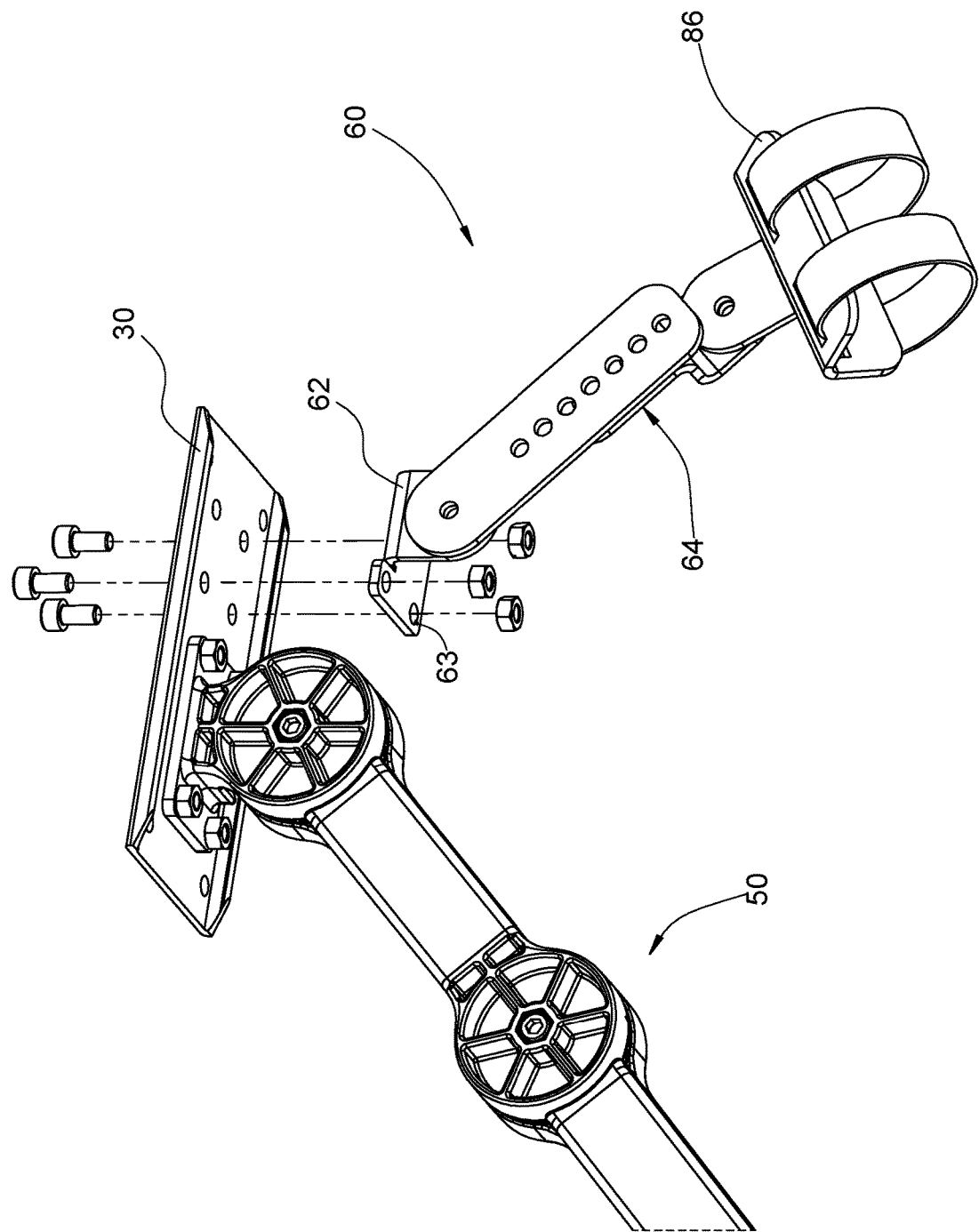
FIG. 9 shows the adjustable carrier attachment of FIG. 8 with the secondary adjustable arm decoupled from an animal carrier mount, according to an embodiment of the disclosure.

In order to assist in supporting particularly heavy loads, adjustable carrier attachment 100 may include a secondary carrier attachment 60 as now described in further detail below. Turning to FIGS. 6 and 7, there is shown adjustable arm 50 secured to bicycle 90 and secondary carrier attachment 60 also providing support. As shown in more detail in FIG. 9, secondary carrier attachment 60 includes a secondary adjustable arm 64 extending between first and second ends of secondary carrier attachment 60. At the first end, a secondary bicycle coupling 66 is provided, for securing secondary adjustable arm 64 to bicycle 90. At the second end, a secondary carrier mount 62 is provided, for securing carrier base 72 to secondary adjustable arm 64.

Figure 8:
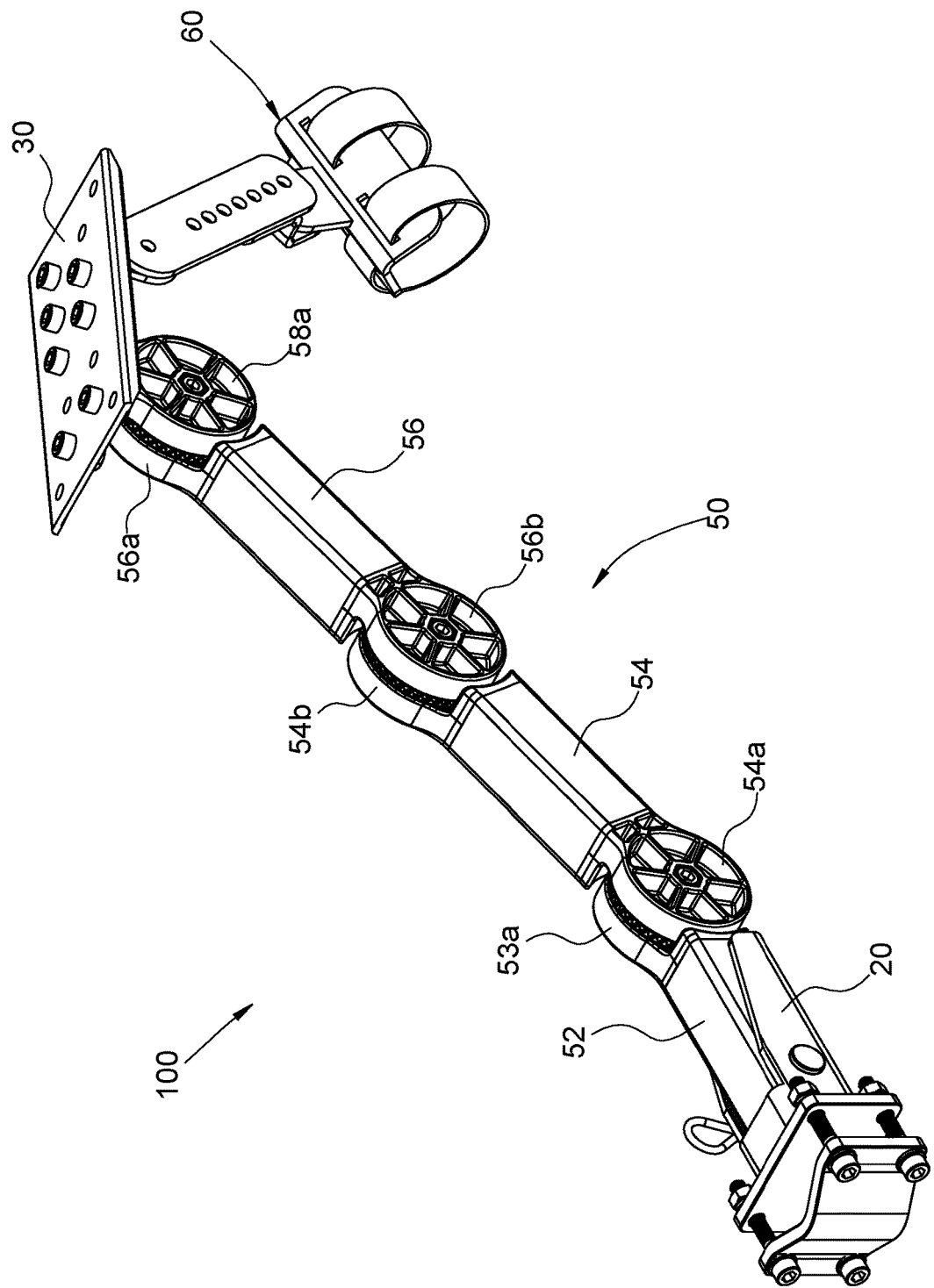
FIG. 8 shows an adjustable carrier attachment decoupled from the bicycle and the animal carrier, and including a secondary adjustable arm, according to an embodiment of the disclosure.

FIG. 8 shows adjustable arm 50 and secondary carrier attachment 60 secured to carrier mount 30. As can then be seen from FIG. 9, suitable fasteners, such as bolts, may be used to secure secondary carrier mount 62 to carrier mount 30 (and in particular to second mount portion 34), by inserting the fasteners through mount apertures 32 formed in second mount portion 34 and through apertures 63 formed in secondary carrier mount 62. According to some embodiments, secondary carrier mount 62 may instead be secured directly to carrier base 72, without necessarily requiring the intermediary of second mount portion 34 of carrier mount 30.

Figure 10:
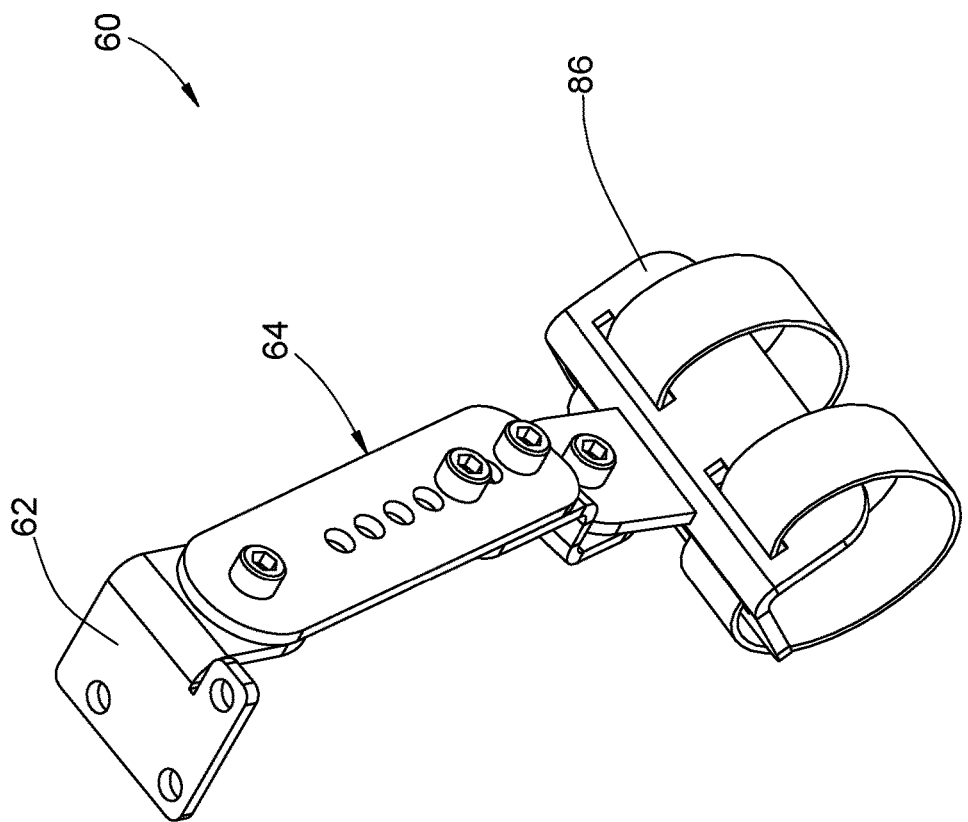
FIG. 10 shows the secondary adjustable arm of FIG. 8, according to an embodiment of the disclosure.
Figure 11:
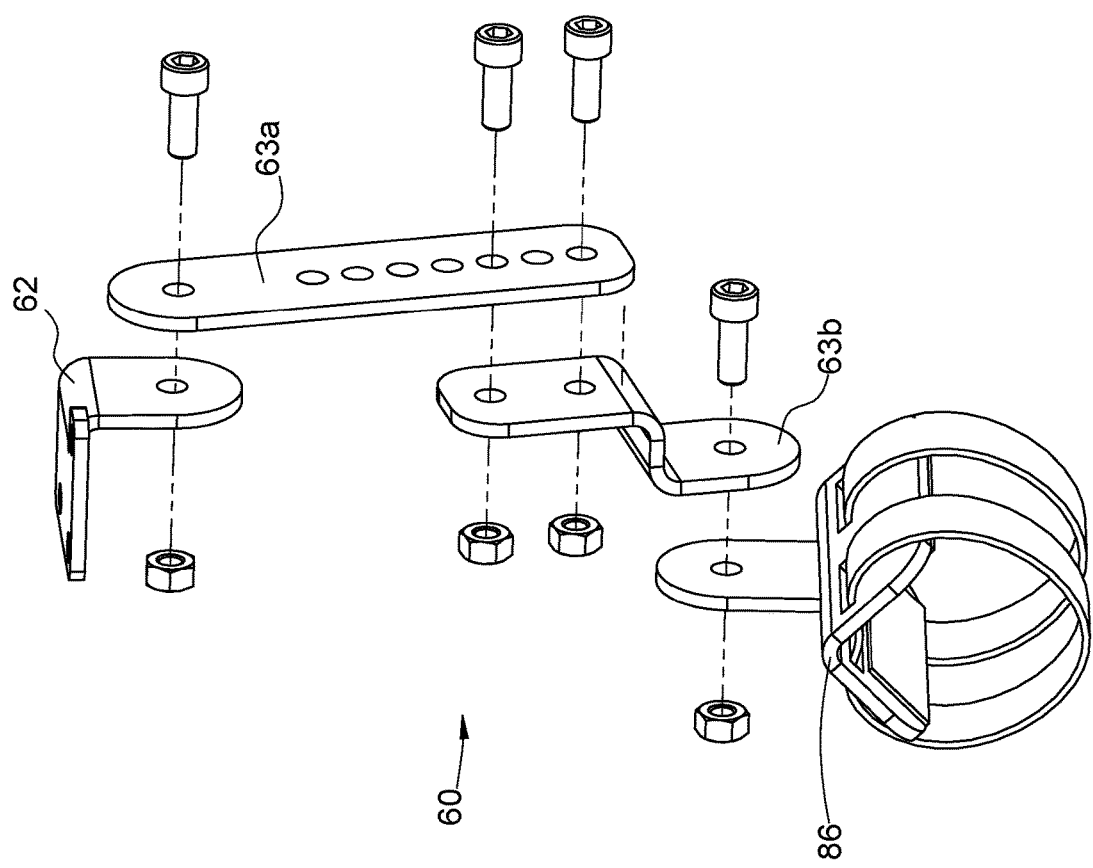
FIG. 11 shows constituent components of the secondary adjustable arm of FIG. 8, according to an embodiment of the disclosure.

FIGS. 10 and 11 show secondary carrier attachment 60 in further detail. As can be seen, secondary adjustable arm 64 is pivotally connected to secondary carrier mount 62 and secondary bicycle coupling 66. The interconnection between secondary adjustable arm 64, secondary carrier mount 62, and secondary bicycle coupling 66 may be assured by means of fasteners extending through corresponding apertures formed in each component. The components may be rotated relative to one another by loosening the fasteners, realigning the components, and then re-engaging the fasteners. Secondary adjustable arm 64 includes a first member 63a that can be secured (for example, using fasteners) to a second member 63b. The longitudinal extent of secondary adjustable arm 64 may be controlled by adjusting the positions at which first member 63a is secured to second member 63b.

It shall be understood that while the interconnection of secondary adjustable arm 64, secondary carrier mount 62, and secondary bicycle coupling 66 has been described in the context of fasteners, any other suitable means of securing the various components to one another may be used.

Figure 30:
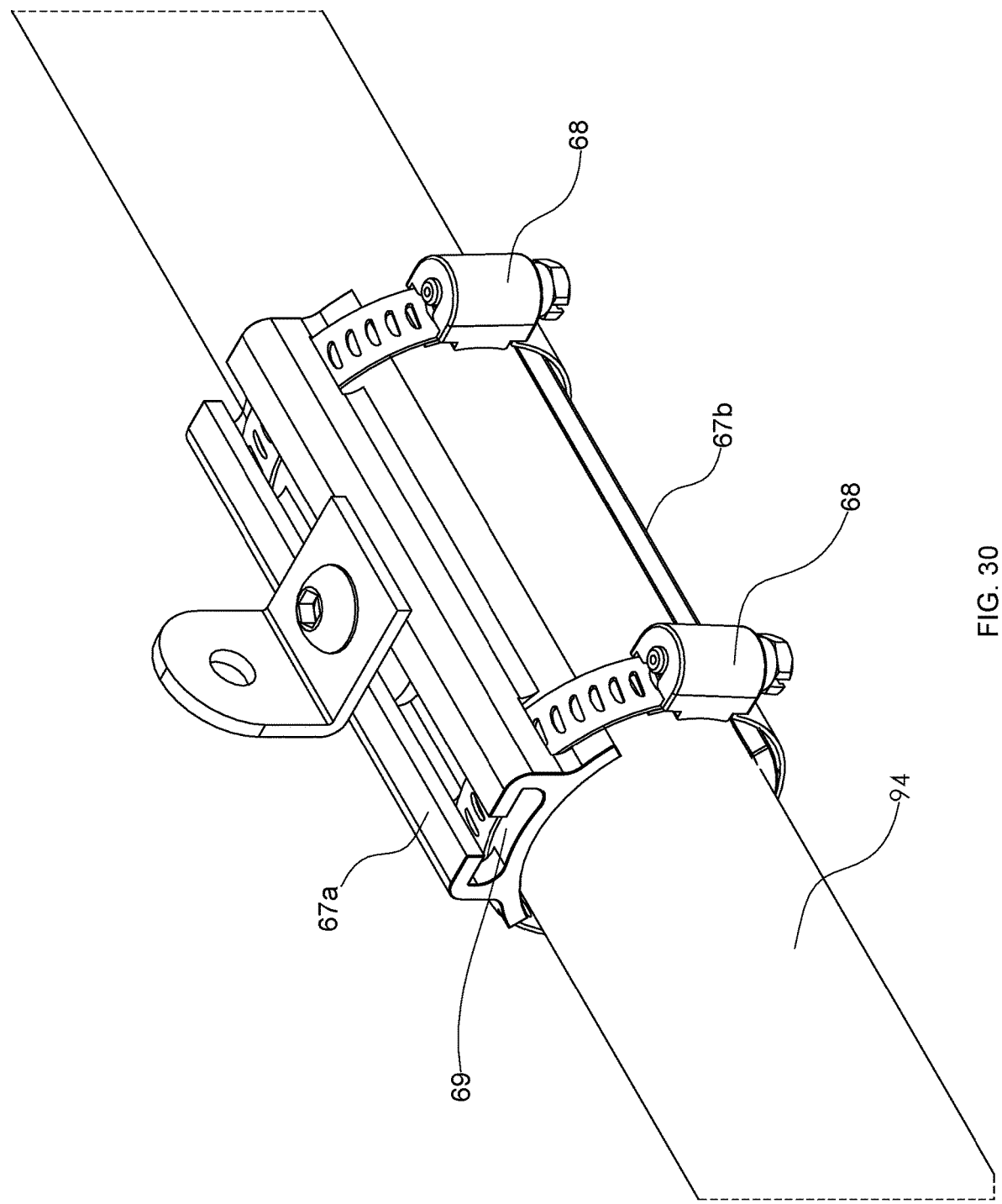
FIG. 30 shows a bicycle coupling for securing a secondary adjustable arm to a bicycle, according to an embodiment of the disclosure.
Figure 31:
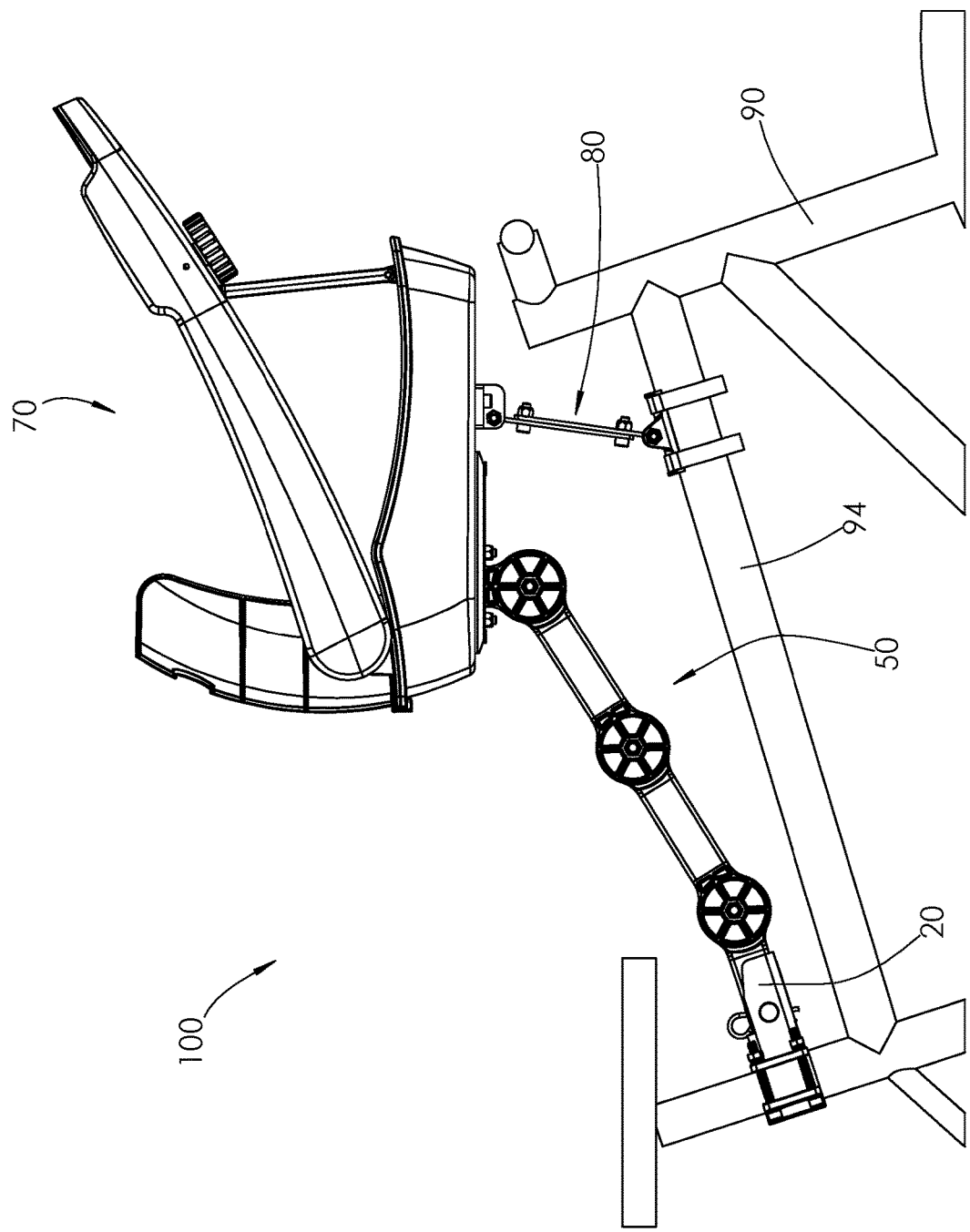
FIG. 31 shows a side-on view of the adjustable carrier attachment, animal carrier, and bicycle of FIG. 1, and including a secondary adjustable arm, according to an embodiment of the disclosure.

As can also be seen in FIGS. 10 and 11, secondary bicycle coupling 66 includes a pair of straps (such as Velcro® straps or rubber Voile Straps®) for securing secondary carrier attachment 60 to a top tube 94 (FIG. 7) of bicycle 90. Other means of connecting secondary carrier attachment 60 to top tube 94 may be used. For example, according to the alternative embodiment shown in FIG. 30, upper and lower members 67a, 67b may be positioned to extend at least partly around top tube 94 of bicycle 90. Fasteners, such as hose clamps 68, may be used to secure upper and lower members 67a, 67b to top tube 94. Upper member 67a may include a T-slot 69 that may be secured to secondary carrier attachment 60, for example through the intermediary of a bracket. Instead of T-slot 69, another suitably-shaped adapter may be used, such as a picatinny rail. According to still other embodiments, only upper member 67a or lower member 67b may be needed (for example, if a resiliently deformable material such as rubber is provided between hose clamps 68 and top tube 94).

Furthermore, according to other embodiments, secondary carrier attachment 60 may be configured to attach to another portion of bicycle 90, such as the stem or handlebars 95 of bicycle 90. This may be made possible by taking advantage of the rotatability of secondary adjustable arm 64, secondary carrier mount 62, and secondary bicycle coupling 66 relative to one another, in order to reposition secondary bicycle coupling 66 relative to bicycle 90.

FIGS. 31-38 illustrate alternative embodiments of a secondary carrier attachment that may be used to provide additional load-bearing support to animal carrier 70 (for example, to assist in supporting relatively heavy loads).

Figure 32:
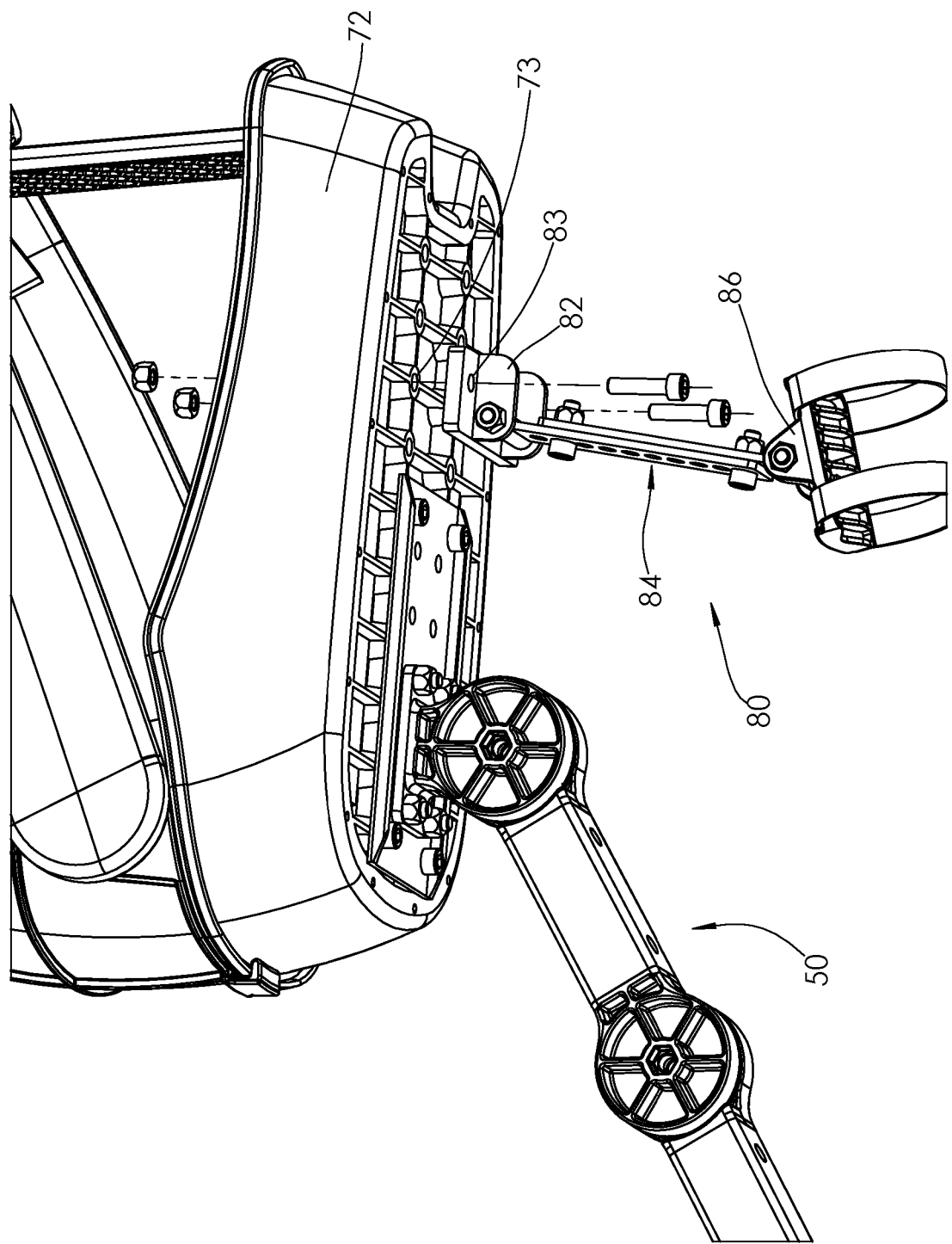
FIG. 32 shows another view of the adjustable carrier attachment and animal carrier of FIG. 31, and shows how the secondary adjustable arm couples to the animal carrier, according to an embodiment of the disclosure.

As can be seen in FIG. 32, secondary carrier attachment 80 includes a secondary adjustable arm 84 extending between first and second ends of secondary carrier attachment 80. At the first end, a secondary bicycle coupling 86 is provided, for securing secondary adjustable arm 84 to bicycle 90. At the second end, a secondary carrier mount 82 is provided, for securing carrier base 72 to secondary adjustable arm 84. As can also be seen from FIG. 32, suitable fasteners, such as bolts, may be used to secure secondary carrier mount 82 to carrier base 72, by inserting the fasteners through base apertures 73 formed in carrier base 72 and through apertures 83 formed in secondary carrier mount 82.

Figure 33:
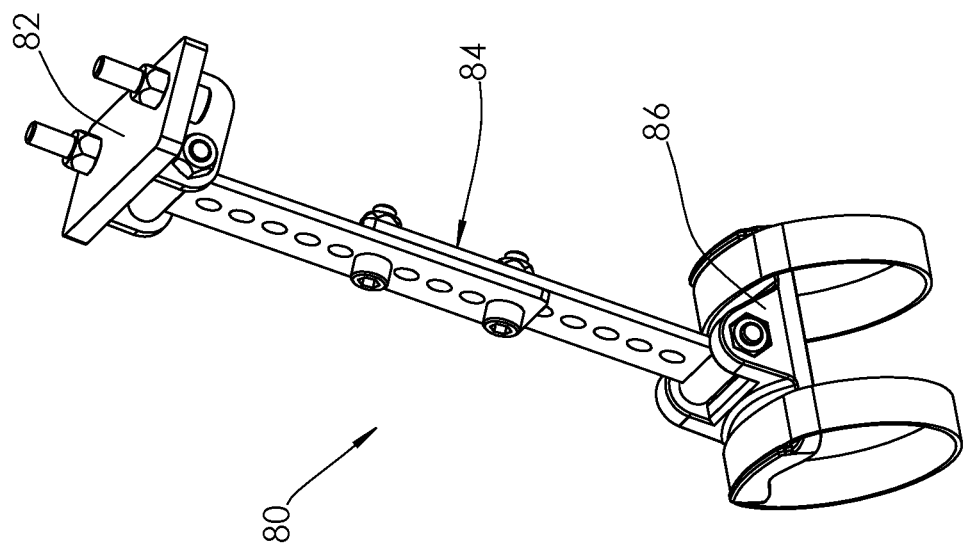
FIG. 33 shows the secondary adjustable arm of FIGS. 31 and 32, according to an embodiment of the disclosure.
Figure 34:
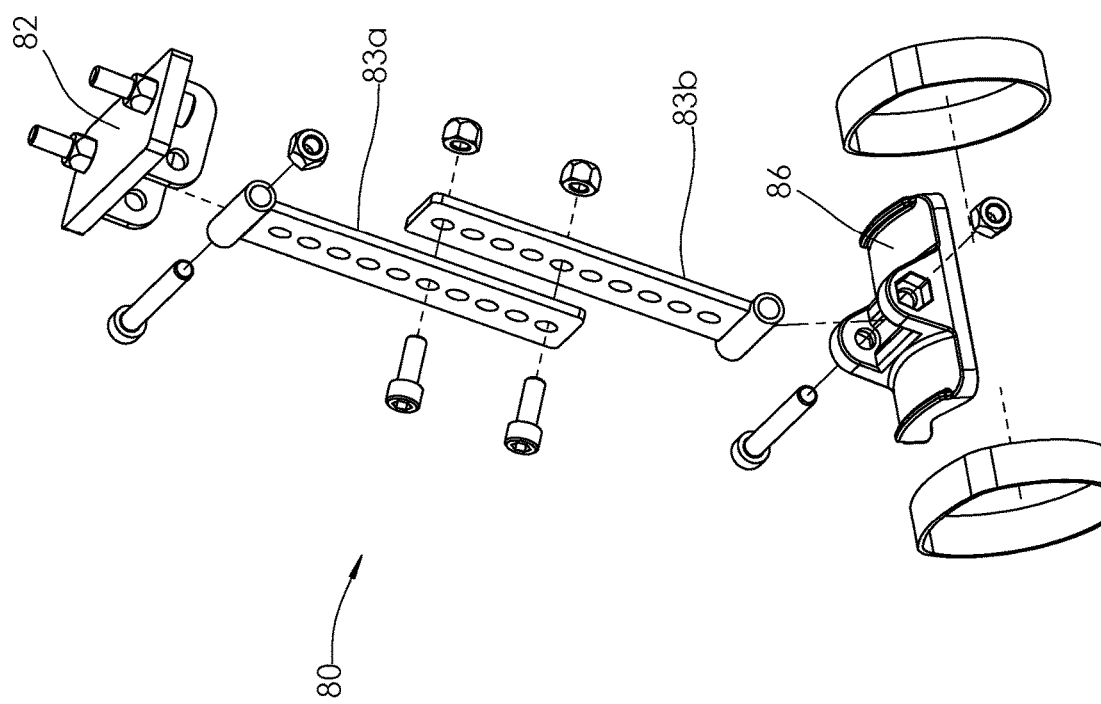
FIG. 34 shows constituent components of the secondary adjustable arm of FIG. 33, according to an embodiment of the disclosure.

FIGS. 33 and 34 show secondary carrier attachment 80 in further detail. As can be seen, secondary adjustable arm 84 is pivotally connected to secondary carrier mount 82 and secondary bicycle coupling 86. The interconnection between secondary adjustable arm 84, secondary carrier mount 82, and secondary bicycle coupling 86 may be assured by means of fasteners extending through corresponding apertures formed in each component. The components may be rotated relative to one another by loosening the fasteners, realigning the components, and then re-engaging the fasteners. Secondary adjustable arm 84 includes a first member 83$a$ that can be secured (for example, using fasteners) to a second member 83$b$. The longitudinal extent of secondary adjustable arm 84 may be controlled by adjusting the positions at which first member 83$a$ is secured to second member 83$b$.

It shall be understood that while the interconnection of secondary adjustable arm 84, secondary carrier mount 82, and secondary bicycle coupling 86 has been described in the context of fasteners, any other suitable means of securing the various components to one another may be used.

As can also be seen in FIGS. 33 and 34, secondary bicycle coupling 86 includes a pair of straps (such as Velcro® straps or rubber Voile Straps®) for securing secondary carrier attachment 80 to a top tube 94 (FIG. 31) of bicycle 90. Other means of connecting secondary carrier attachment 80 to top tube 94 may be used (for example, using the alternative embodiment shown in FIG. 30 and described above).

Furthermore, according to other embodiments, secondary carrier attachment 80 may be configured to attach to another portion of bicycle 90, such as the stem or handlebars 95 of bicycle 90. This may be made possible by taking advantage of the rotatability of secondary adjustable arm 84, secondary carrier mount 82, and secondary bicycle coupling 86 relative to one another, in order to reposition secondary bicycle coupling 86 relative to bicycle 90.

Figure 35:
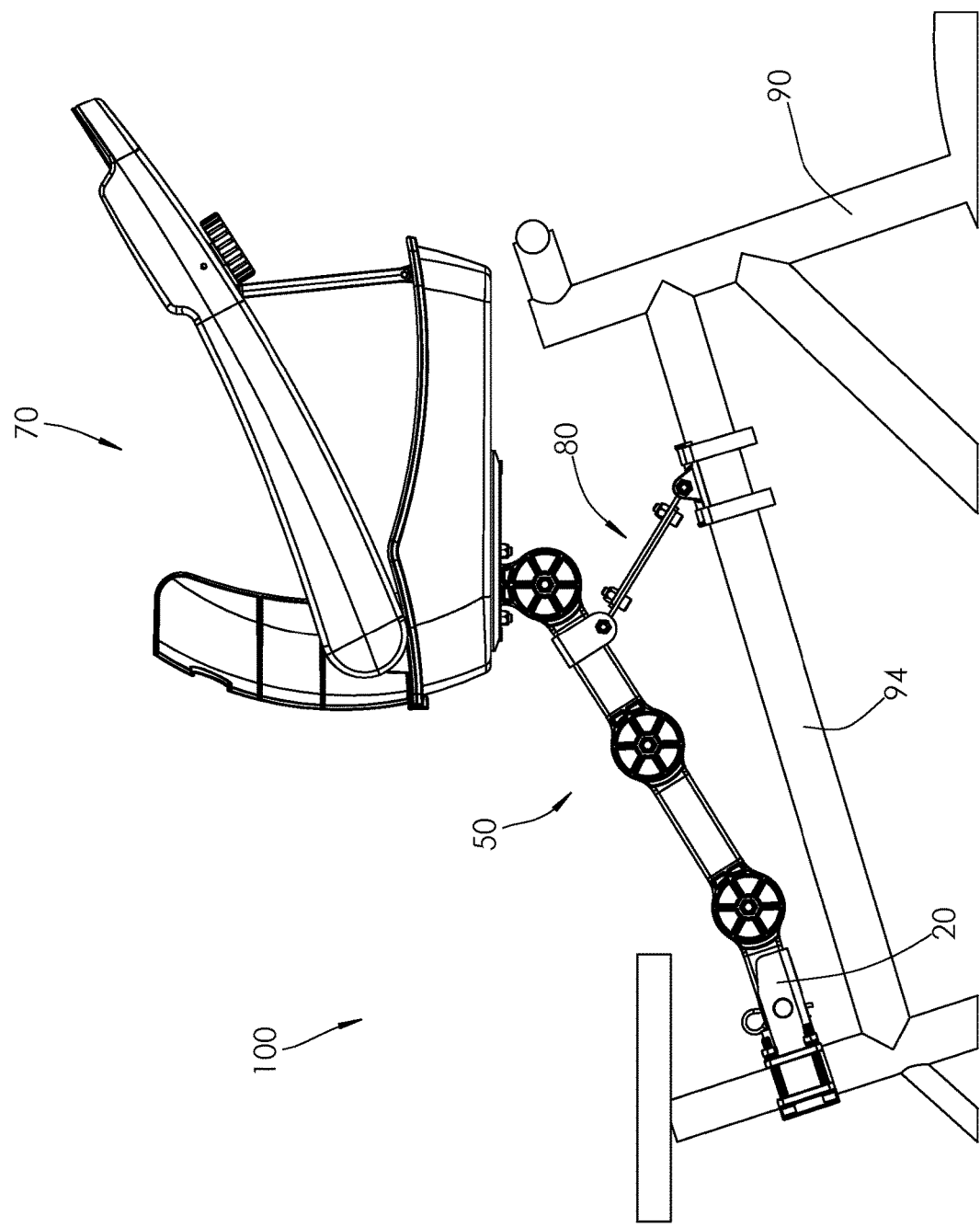
FIG. 35 shows a side-on view of the adjustable carrier attachment, animal carrier, and bicycle of FIG. 1, and including a secondary adjustable arm, according to an embodiment of the disclosure.
Figure 36:
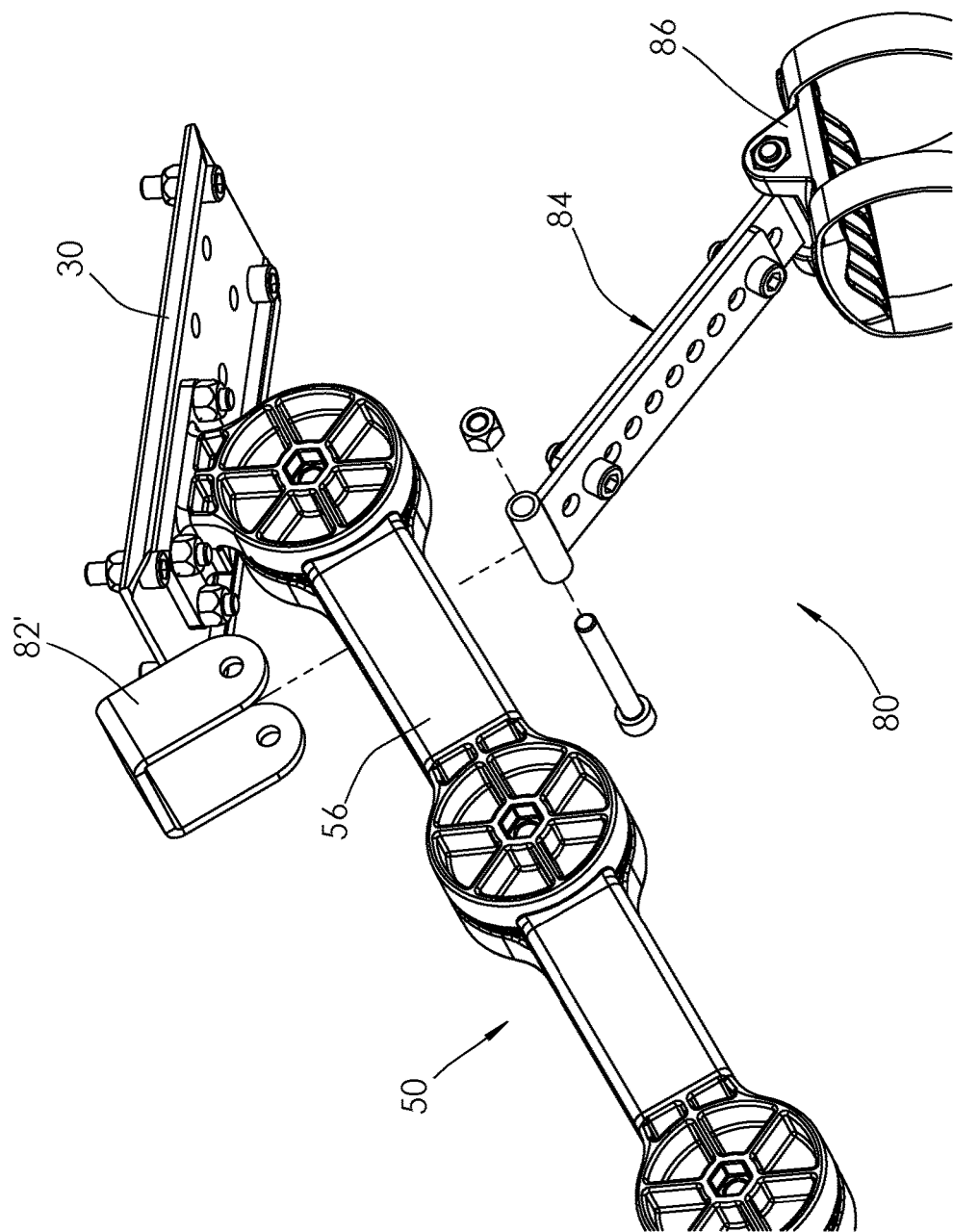
FIG. 36 shows another view of the adjustable carrier attachment of FIG. 35 and how the secondary adjustable arm couples to the adjustable carrier attachment, according to an embodiment of the disclosure.

According to a still further embodiment of secondary carrier attachment 80, secondary carrier attachment 80 may be configured to be coupled to both top tube 94 and adjustable arm 50. For example, as can be seen in FIGS. 35 and 36, a secondary carrier mount 82' of secondary carrier attachment 80 is secured to third arm portion 56 of adjustable arm 50, while secondary bicycle coupling 86 is secured to top tube 94.

Figure 37:
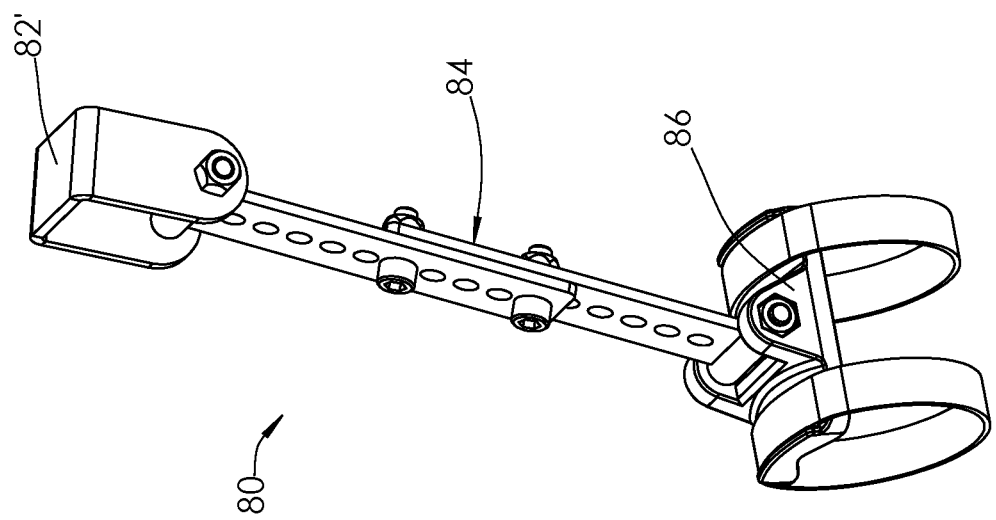
FIG. 37 shows the secondary adjustable arm of FIGS. 35 and 36, according to an embodiment of the disclosure.
Figure 38:
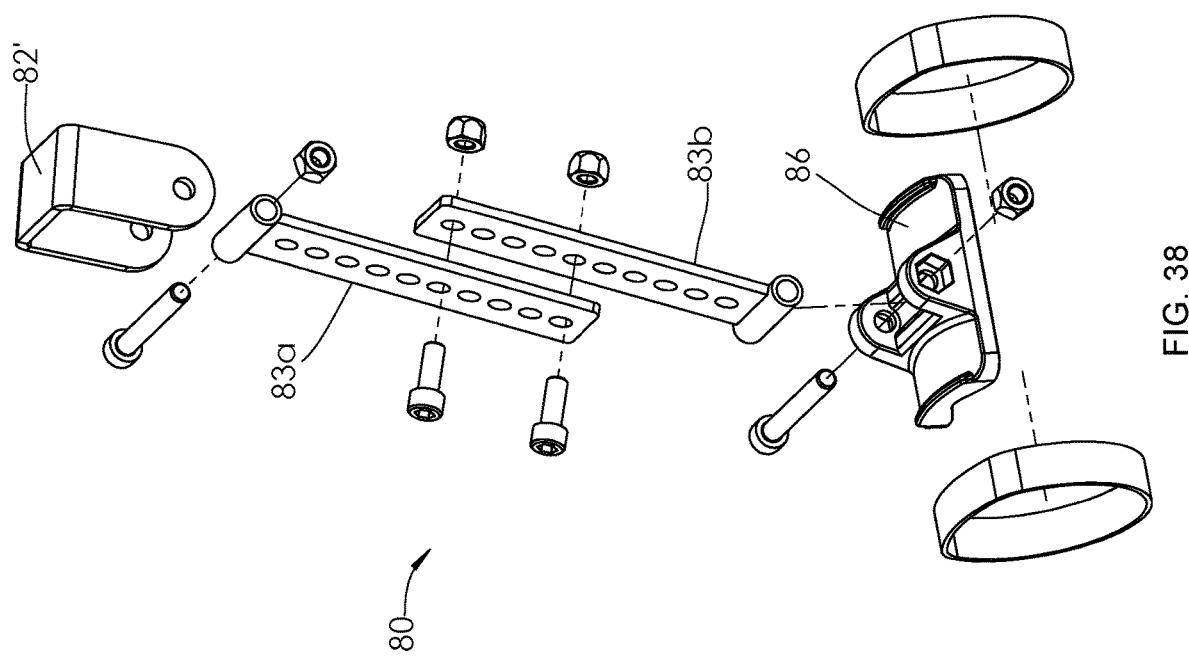
FIG. 38 shows constituent components of the secondary adjustable arm of FIG. 37, according to an embodiment of the disclosure.

FIGS. 37 and 38 show secondary carrier attachment 80 in further detail. As can be seen, secondary adjustable arm 84 is pivotally connected to secondary carrier mount 82' and secondary bicycle coupling 86. The interconnection between secondary adjustable arm 84, secondary carrier mount 82', and secondary bicycle coupling 86 may be assured by means of fasteners extending through corresponding apertures formed in each component. The components may be rotated relative to one another by loosening the fasteners, realigning the components, and then re-engaging the fasteners. Secondary adjustable arm 84 includes a first member 83$a$ that can be secured (for example, using fasteners) to a second member 83$b$. The longitudinal extent of secondary adjustable arm 84 may be controlled by adjusting the positions at which first member 83$a$ is secured to second member 83$b$.

In the embodiment of FIGS. 35-38, secondary carrier attachment 82' differs in shape to secondary carrier attachment 82 of FIGS. 31-34 in order to allow secondary carrier attachment 82' to be secured to third arm portion 56 of adjustable arm 50. According to other embodiments, secondary carrier attachment 82' may be secured to a different portion of adjustable arm 50.

Figure 12:
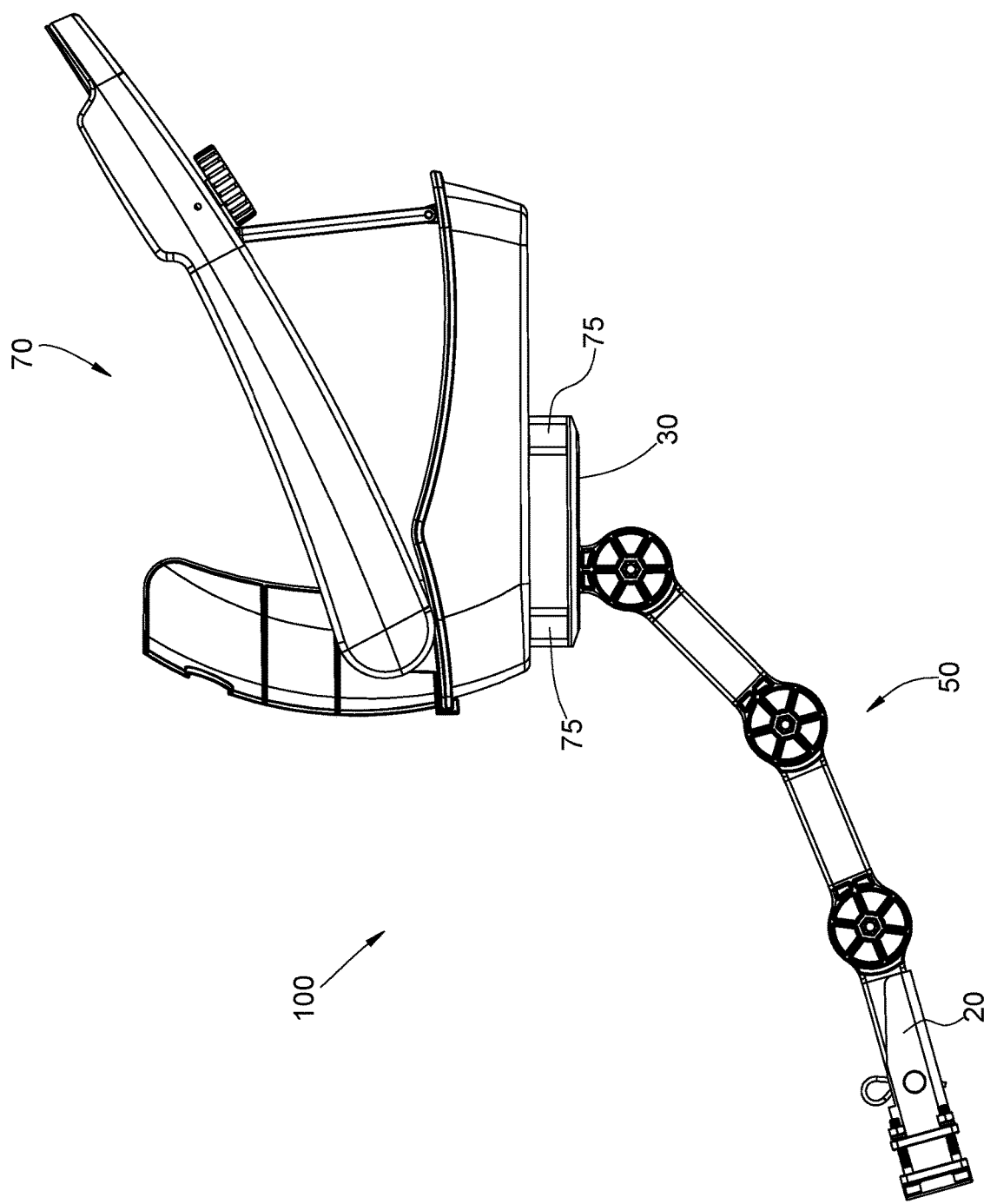
FIG. 12 shows a side-on view of the adjustable carrier attachment and animal carrier of FIG. 1, including the use of spacers, according to an embodiment of the disclosure.
Figure 13:
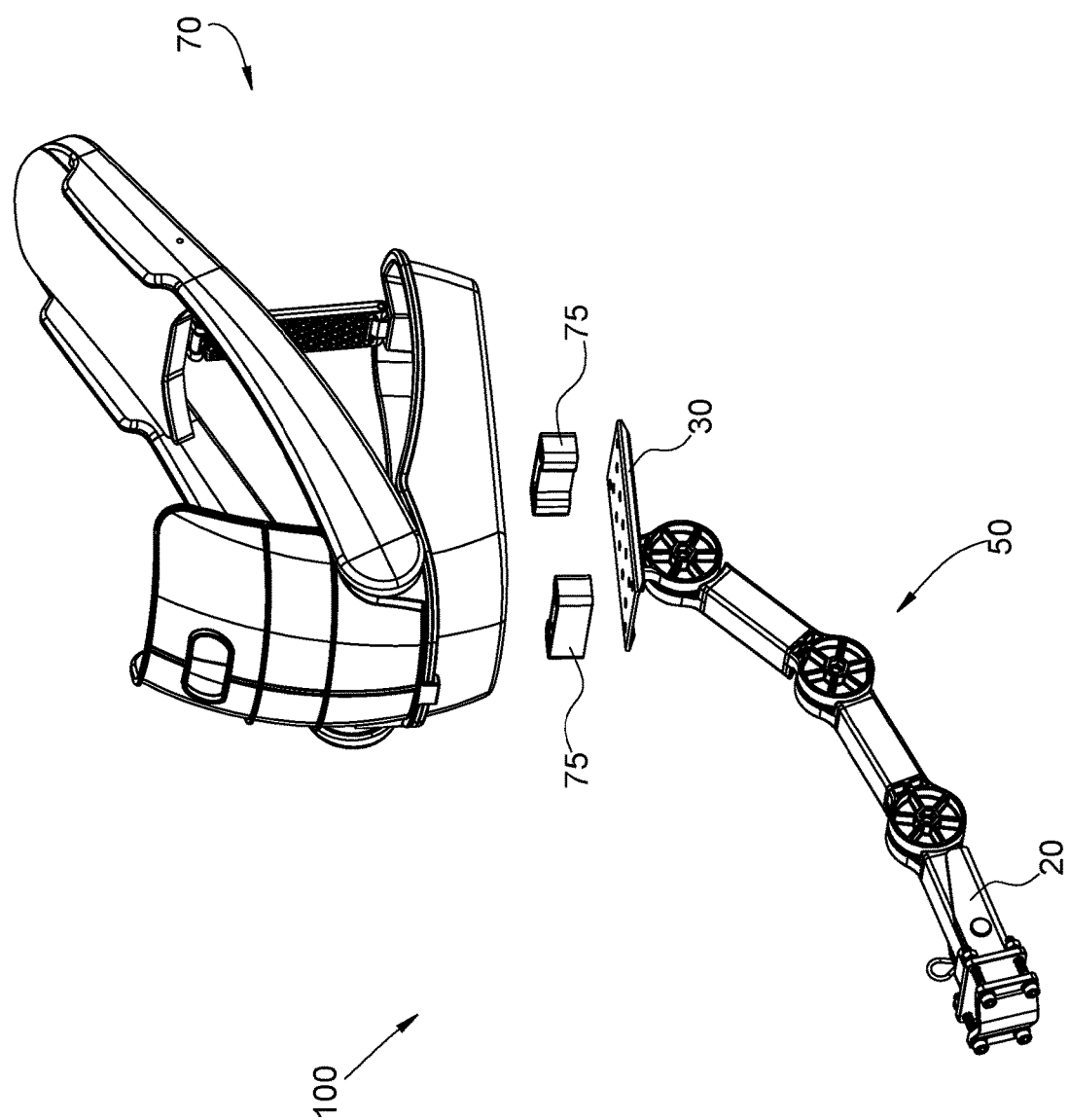
FIG. 13 shows another view of the spacers of FIG. 12 being used to space the animal carrier from the adjustable carrier attachment, according to an embodiment of the disclosure.

Turning to FIGS. 12 and 13, there is shown adjustable carrier attachment 100 being used in conjunction with shims or spacers 75 that may be secured between animal carrier 70 and carrier mount 30. Spacers 75 may be used to increase the vertical clearance of animal carrier 70 relative to handlebars 95 (FIG. 2) of bicycle 90. This may be particularly useful for relatively small bicycles with a relatively large vertical distance between the seat post and the handlebars.

Figure 14:
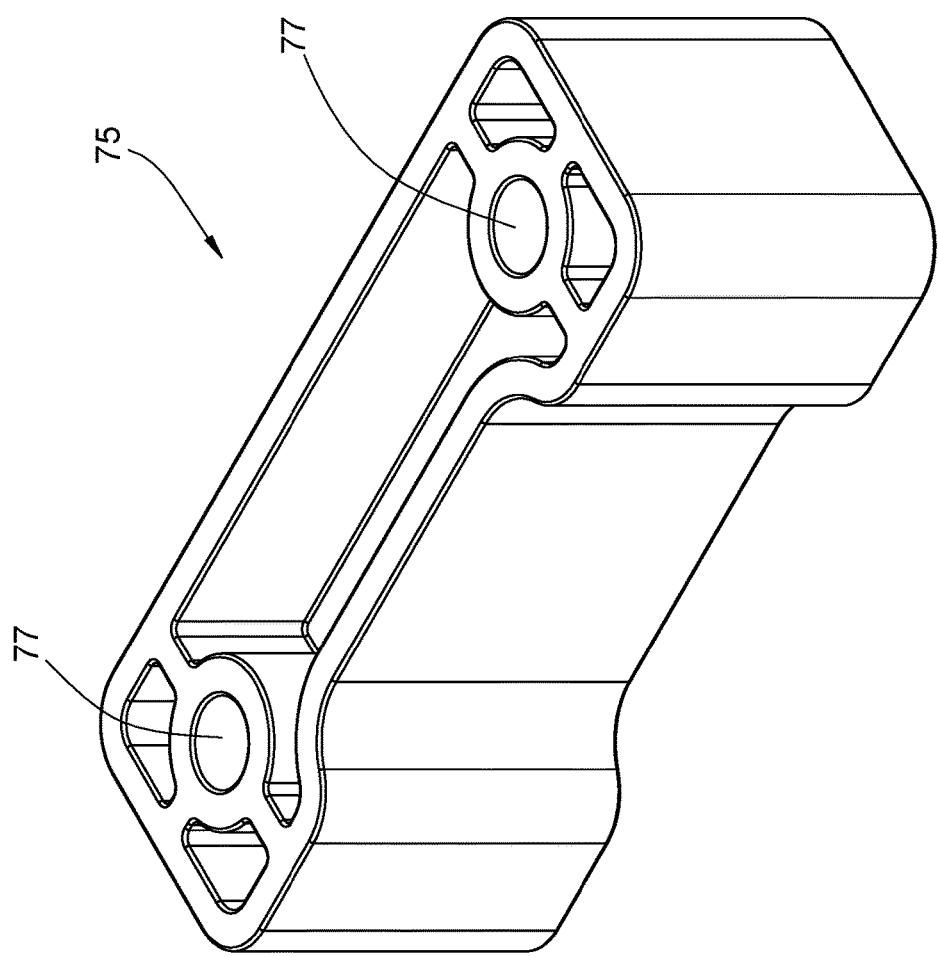
FIG. 14 shows a spacer from FIGS. 12 and 13, according to an embodiment of the disclosure.
Figure 15:
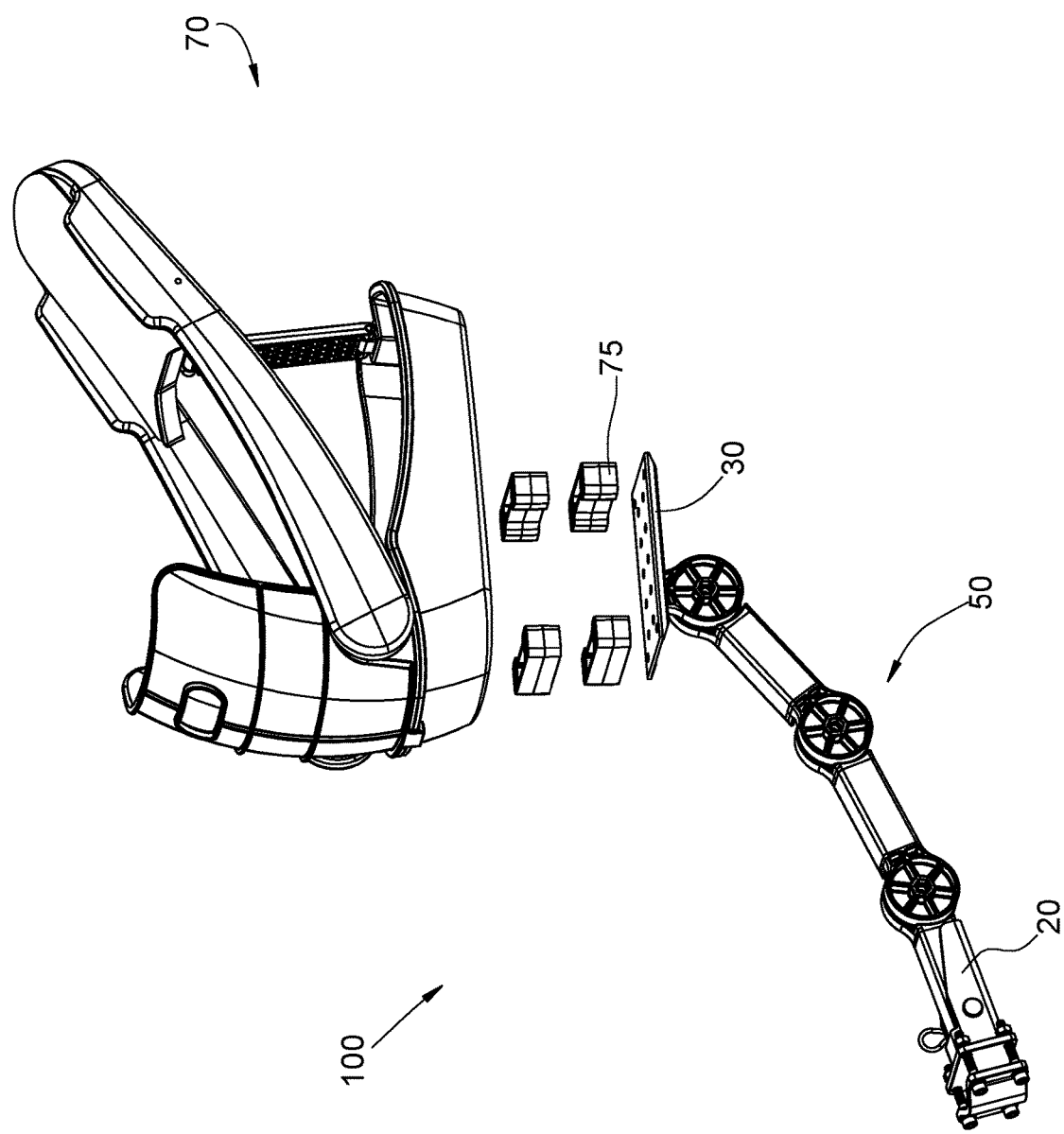
FIG. 15 shows additional spacers being used to space the animal carrier from the adjustable carrier attachment, according to an embodiment of the disclosure.

Spacer 75 is shown in more detail in FIG. 14, wherein apertures 77 are used to receive the fasteners that secure carrier base 72 to carrier mount 30. FIG. 15 shows another embodiment in which a total of four spacers 75 are used to provide even greater vertical clearance of animal carrier 70 relative to handlebars 95 of bicycle 90.

FIGS. 16-19 show different embodiments of adjustable arms that may be used instead of the adjustable arm shown in FIG. 1.

Figure 16:
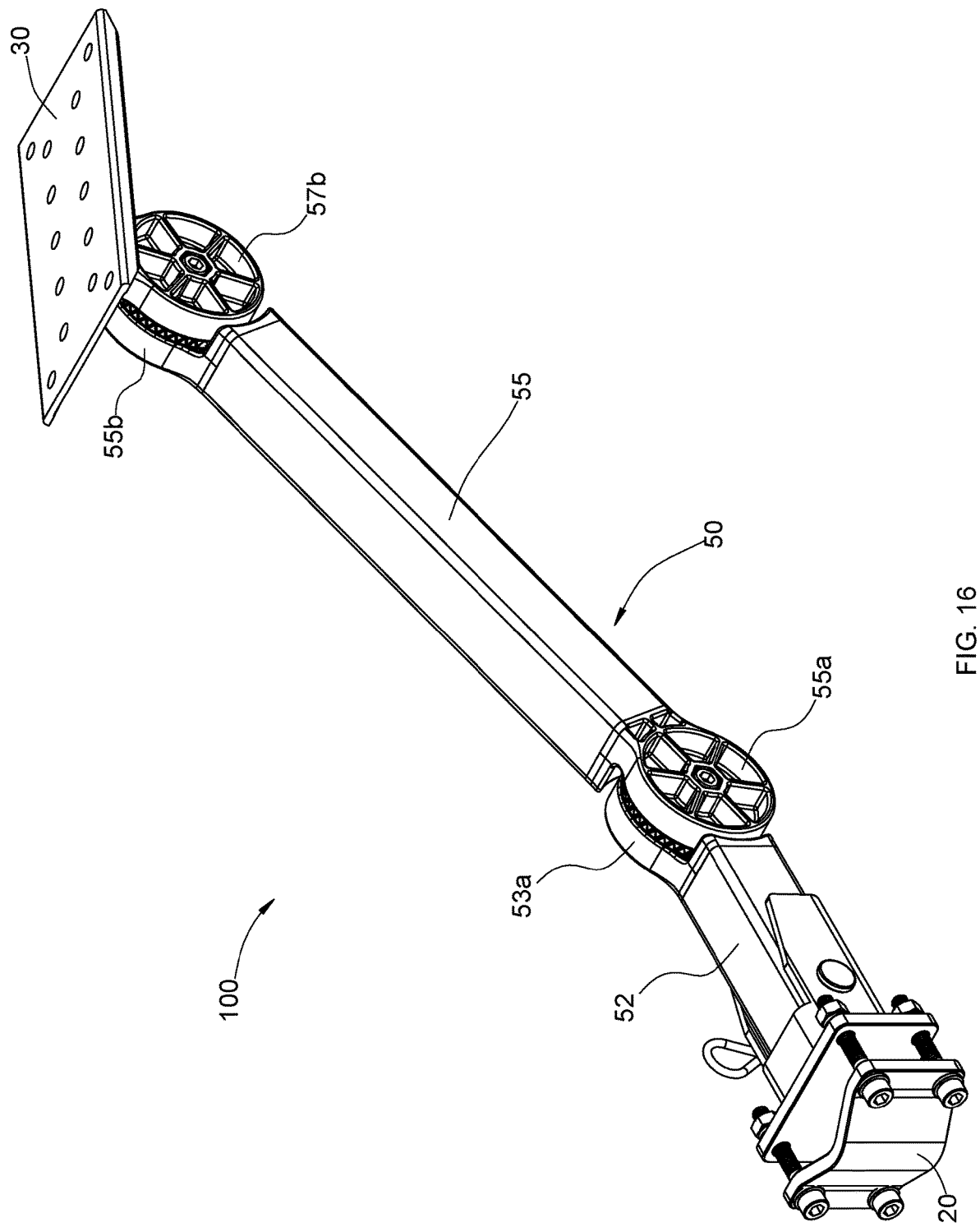
FIG. 16 shows another version of an adjustable carrier attachment, according to an embodiment of the disclosure.

In particular, in FIG. 16, adjustable arm 50 includes a first arm portion 52 connected to bicycle mount 20, and a second, longer arm portion 55 connected to first arm portion 52 and carrier mount 30. Again, the interconnection of first arm portion 52 to second arm portion 55, as well as second arm portion 55 to carrier mount 30, is made by means of toothed or otherwise interlocking gears. In particular, first arm portion includes a first gear 53$a$ interlocked with a second gear 55$a$ comprised in second arm portion 55. Second arm portion 55 further includes a third gear 55$b$ interlocked with a fourth gear 57$b$ secured to carrier mount 30.

Figure 17:
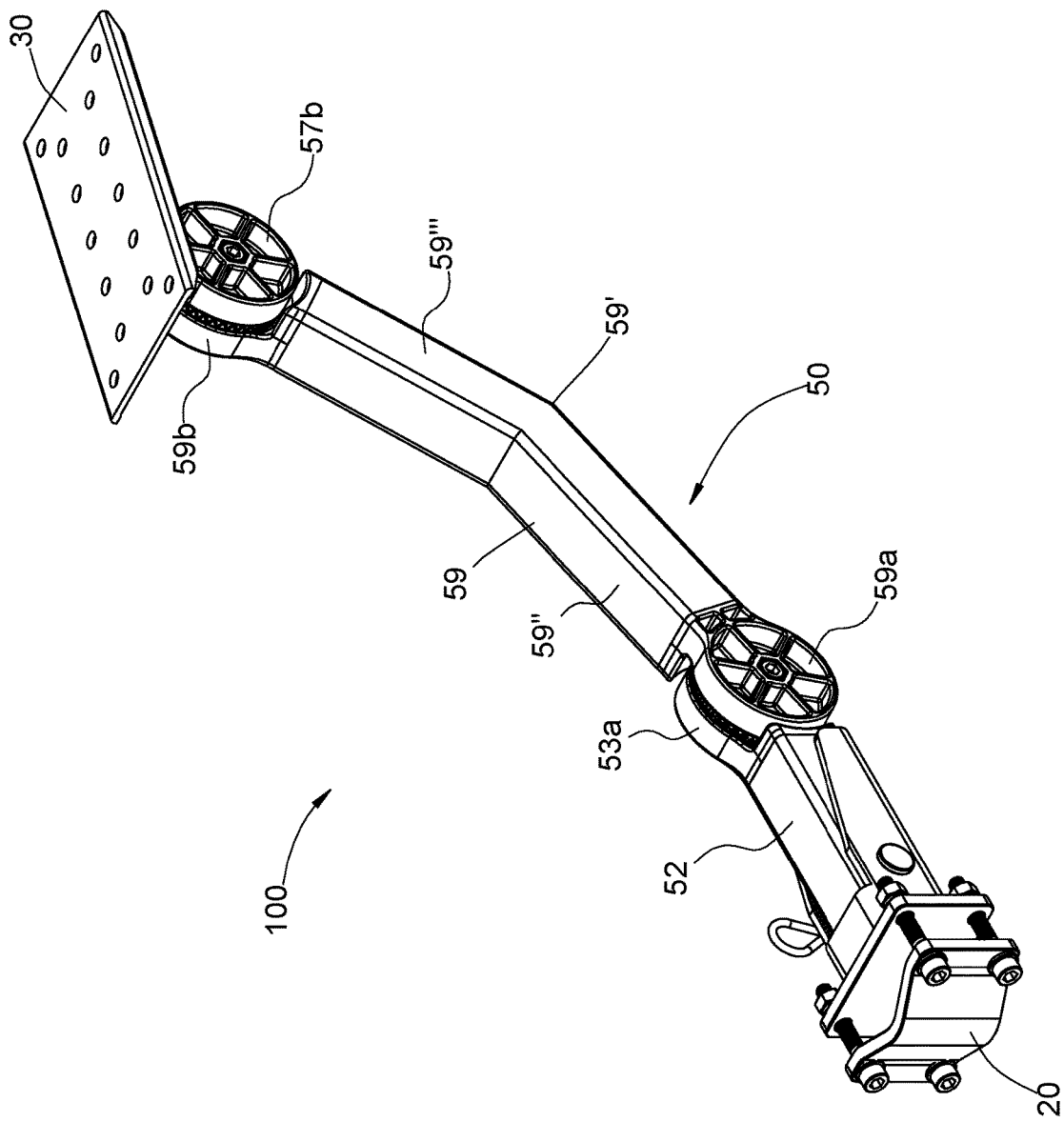
FIG. 17 shows another version of an adjustable carrier attachment, according to an embodiment of the disclosure.

In FIG. 17, adjustable arm 50 includes a first arm portion 52 connected to bicycle mount 20, and a second, longer arm portion 59 connected to first arm portion 52 and carrier mount 30. Again, the interconnection of first arm portion 52 to second arm portion 59, as well as second arm portion 59 to carrier mount 30, is made by means of toothed or otherwise interlocking gears. In particular, first arm portion 52 includes a first gear 53$a$ interlocked with a second gear 59$a$ comprised in second arm portion 59. Second arm portion 59 further includes a third gear 59$b$ interlocked with a fourth gear 57$b$ secured to carrier mount 30. Unlike second arm portion 55 of FIG. 16, second arm portion 59 of FIG. 17 includes a fixed-angle bend 59' such that second arm portion 59 comprises a first linear segment 59" connected to gear 59$a$ and a second linear segment 59''' connected to gear 59$b$ and at a fixed angle relative to first linear segment 59". Fixed-angle bend 59' may be useful, for example, for bicycles with particularly long saddles.

Figure 18:
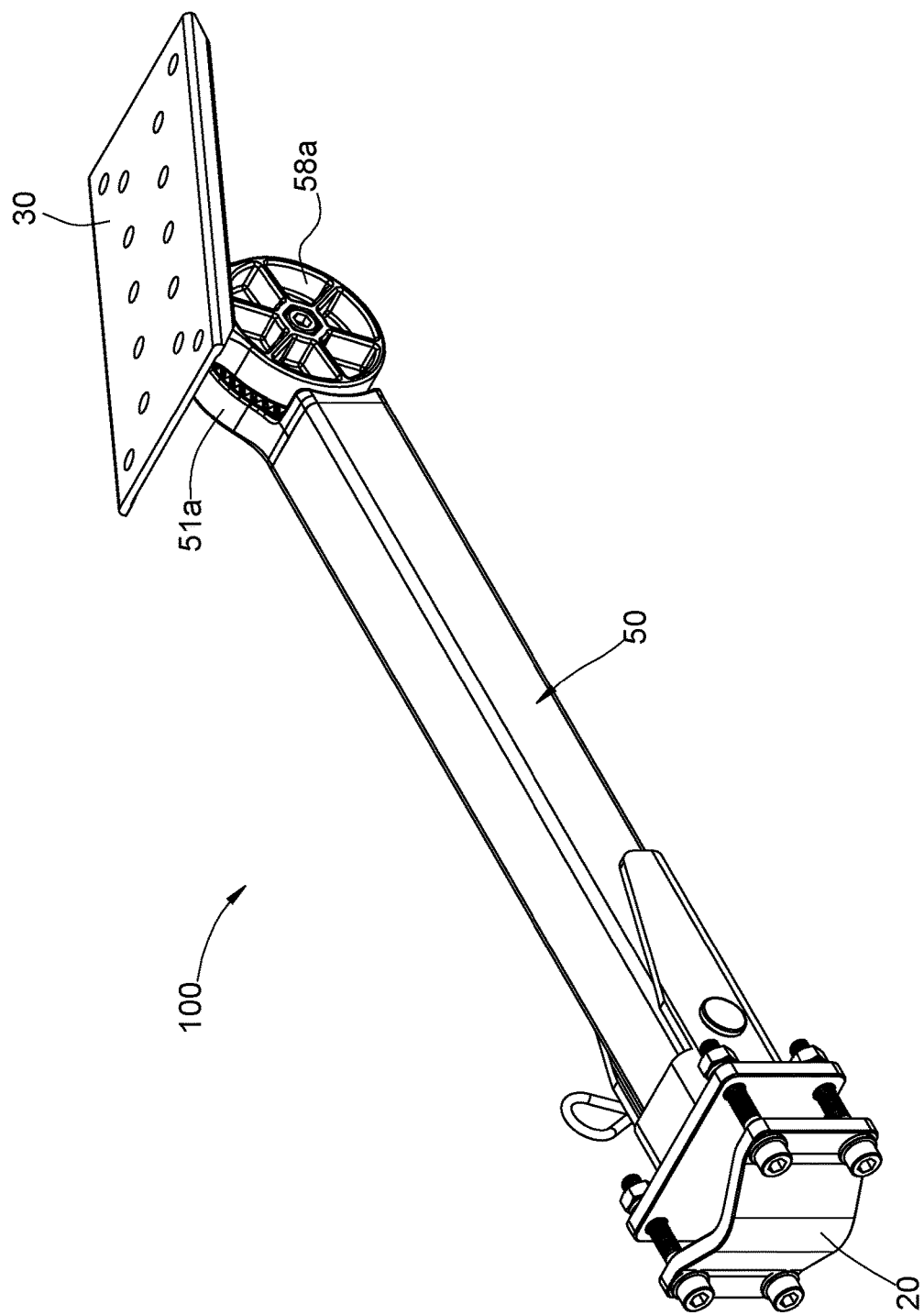
FIG. 18 shows another version of an adjustable carrier attachment, according to an embodiment of the disclosure.

FIG. 18 shows an adjustable arm 50 that comprises a single arm portion connected to bicycle coupling 20 at a first end thereof. At the second end thereof, the single arm portion includes a first gear 51$a$ interlocked with a second gear 58$a$ coupled to carrier mount 30. As described above, carrier mount 30 may be rotated relative to bicycle coupling 20 by adjusting the relative angles of rotation of first and second gears 51$a$, 58$a$.

Figure 19:
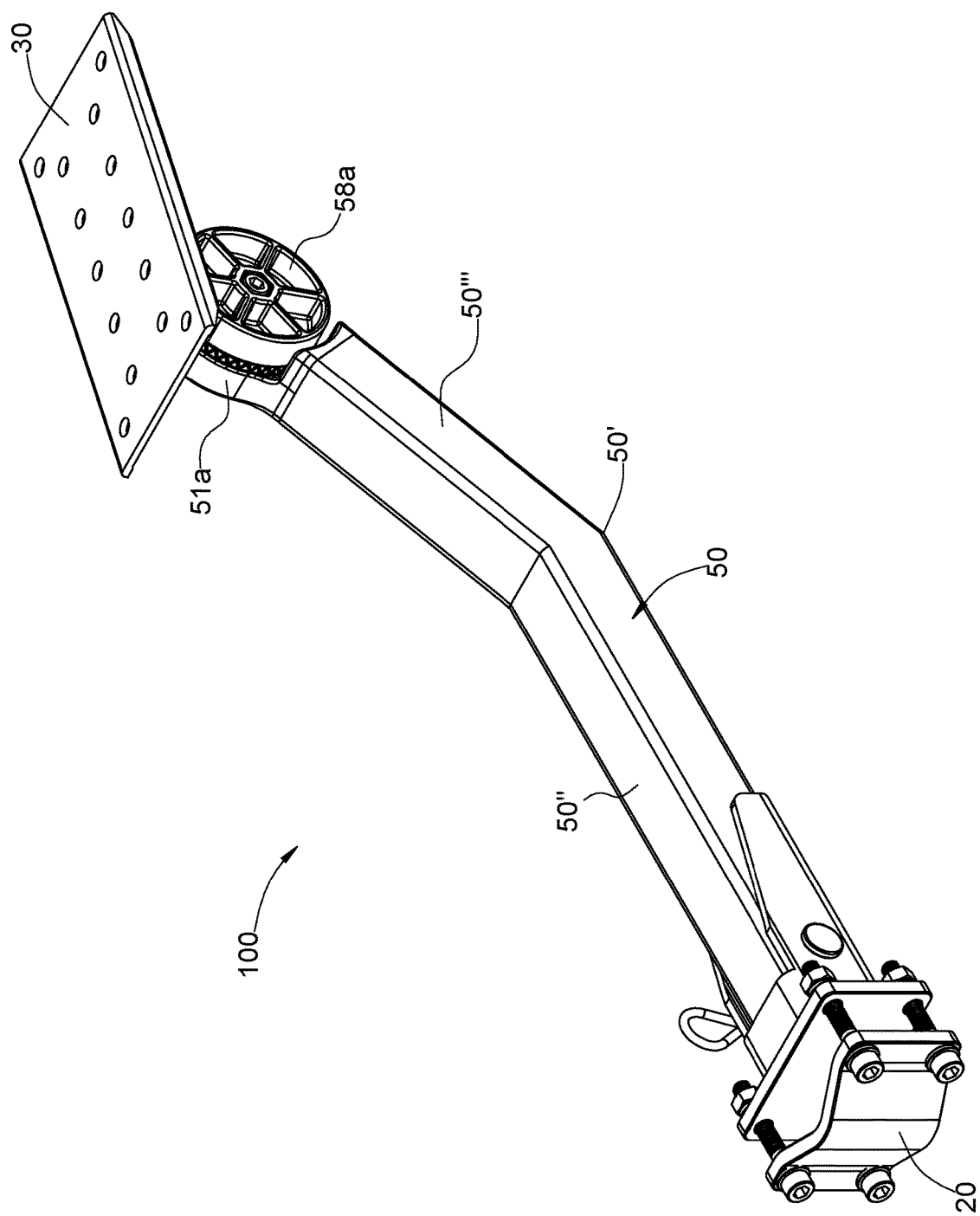
FIG. 19 shows another version of an adjustable carrier attachment, according to an embodiment of the disclosure.

FIG. 19 shows an adjustable arm 50 that comprises a single arm portion connected to bicycle coupling 20 at a first end thereof. At the second end thereof, the single arm portion includes a first gear 51*a* interlocked with a second gear 58*a* coupled to carrier mount 30. Unlike the single arm portion of FIG. 18, the single arm portion of FIG. 19 includes a fixed-angle bend 50' such that the single arm portion comprises a first linear segment 50" connected to bicycle coupling 20 and a second linear segment 50"' connected to gear 51*a* and at a fixed angle relative to first linear segment 50".

As will be appreciated, the variety of different adjustable arms 50 that may be used is generally limitless, provided that adjustable arm 50 enables carrier mount 30 to be rotated relative to bicycle coupling 20.

Figure 20:
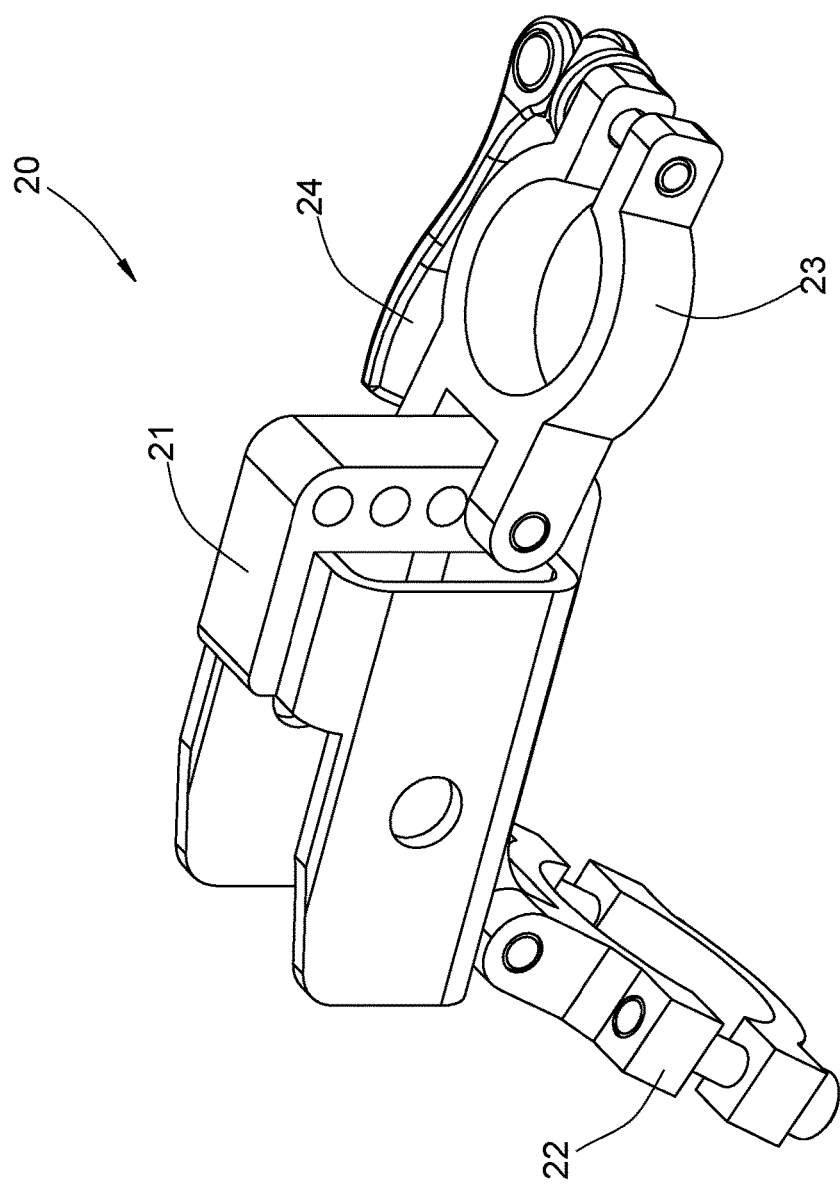
FIG. 20 shows a bicycle coupling comprising a seat clamp and for securing an adjustable carrier attachment to a bicycle, according to an embodiment of the disclosure.
Figure 21:
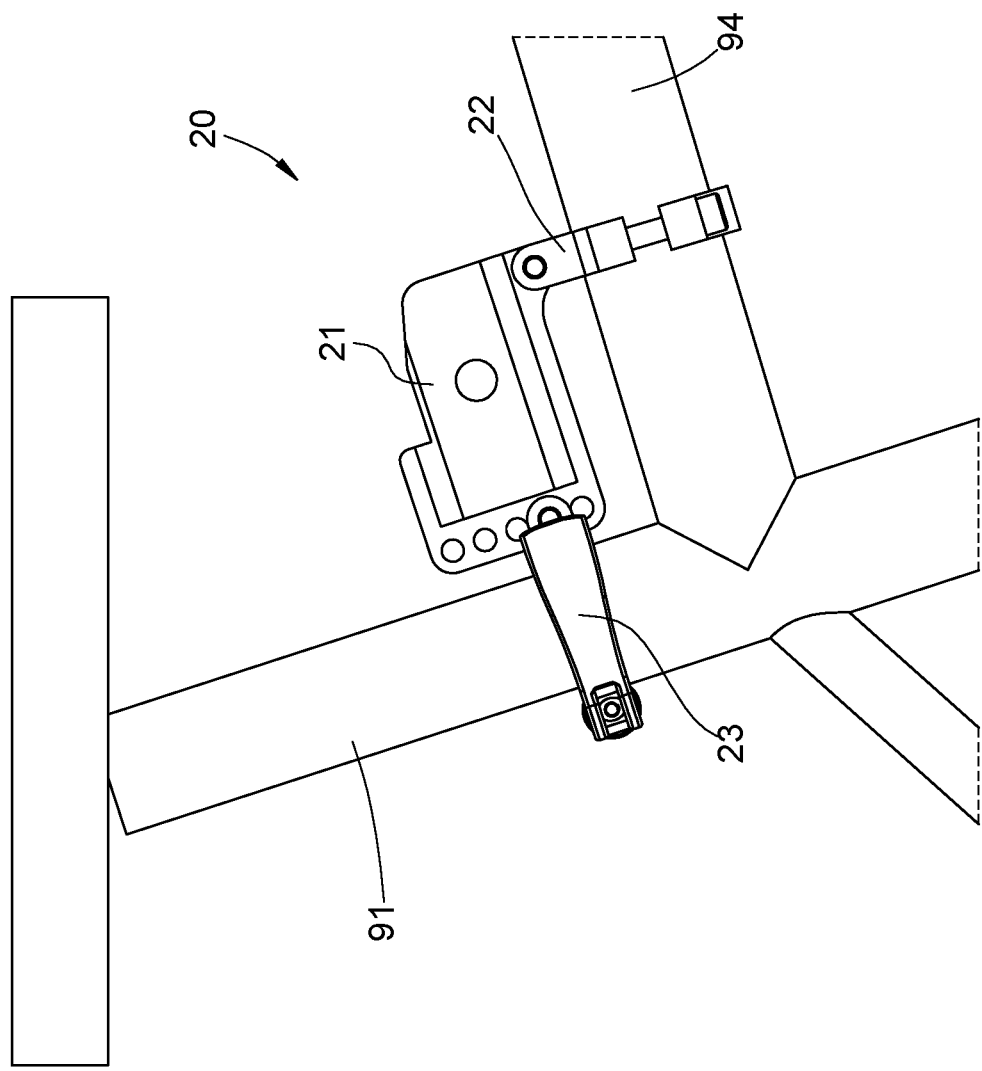
FIG. 21 shows the bicycle coupling of FIG. 20 secured to a seat post and top tube of a bicycle, according to an embodiment of the disclosure.

Turning to FIG. 20, there is shown an embodiment of bicycle coupling 20 in greater detail. In particular, bicycle coupling 20 includes a first clamp 22 and a second clamp 23 interconnected by an intermediary component 21. According to this embodiment, second clamp 23 may act as the seat clamp of seat post 91 of bicycle 90. In particular, a lever 24 may be used to engage/disengage second clamp 23 from seat post 91, exactly as is done for a traditional seat post clamp. As can be seen in FIG. 21, first clamp 22 is positioned to clamp around top tube 94 of bicycle 90, whereas second clamp 23 clamps to seat post 91 of bicycle 90 to assist in securing bicycle coupling 20 to bicycle 90 while also acting to clamp seat post 91 relative to the bicycle frame.

Figure 22:
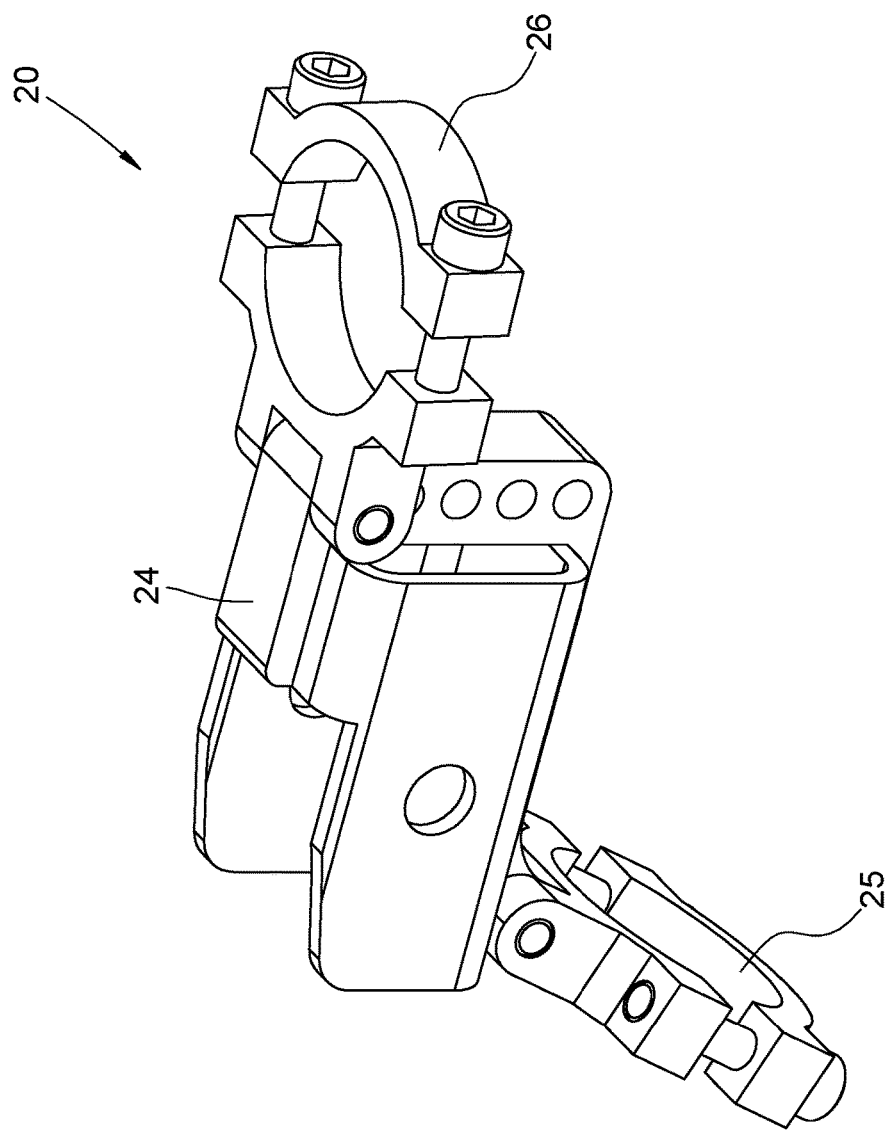
FIG. 22 shows a bicycle coupling for securing an adjustable carrier attachment to a bicycle, according to an embodiment of the disclosure.
Figure 23:
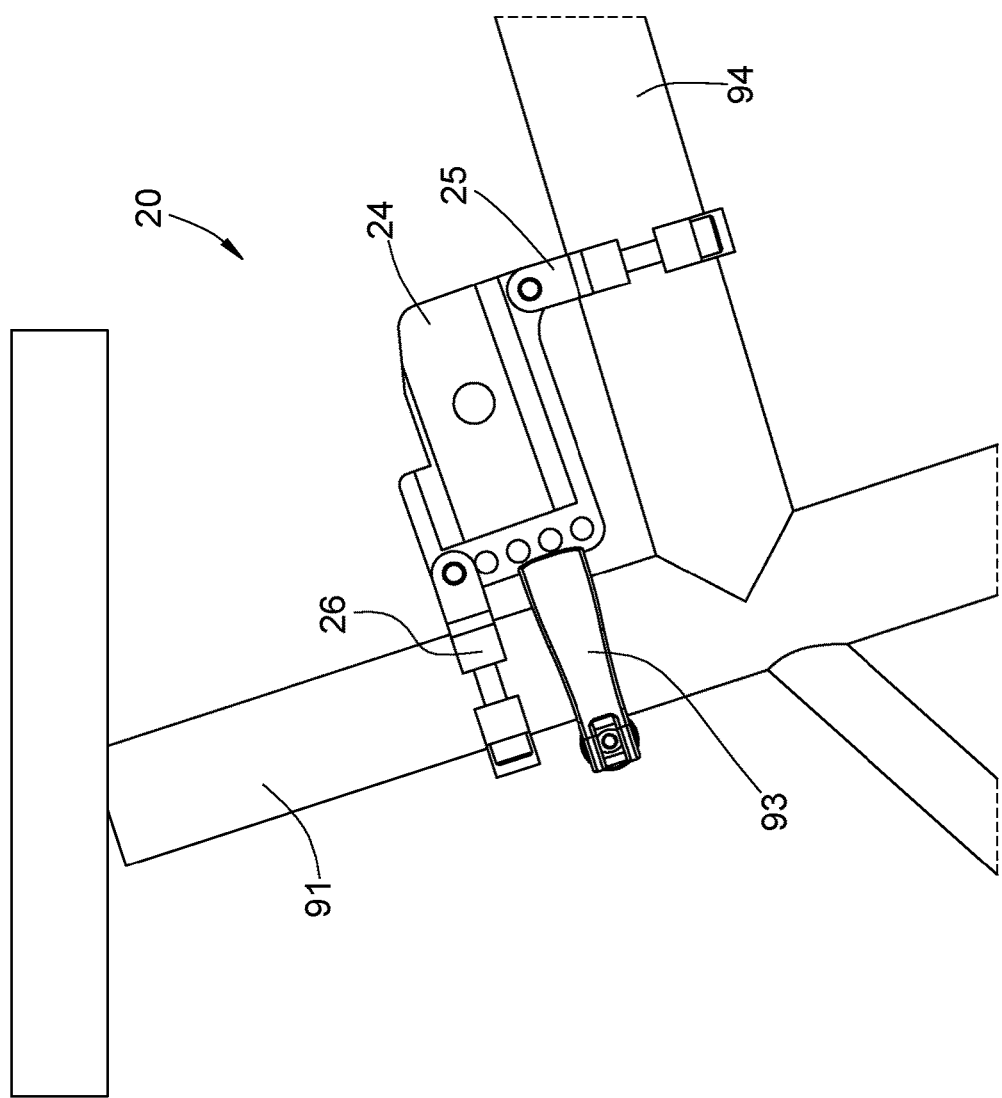
FIG. 23 shows the bicycle coupling of FIG. 22 secured to a seat post and a top tube of a bicycle, according to an embodiment of the disclosure.
Figure 24:
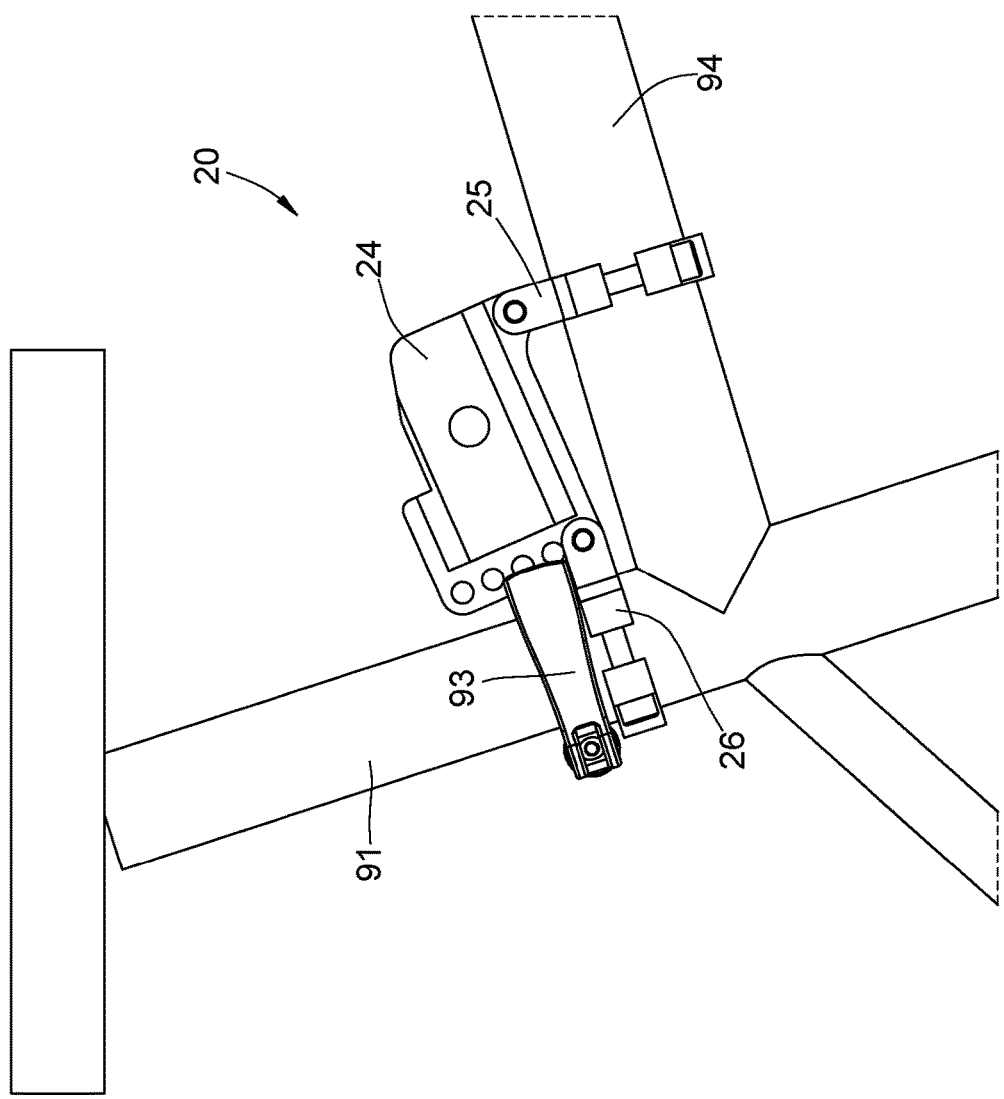
FIG. 24 shows the bicycle coupling of FIG. 22 secured to a seat post and a top tube of a bicycle, according to an embodiment of the disclosure.

FIGS. 22 and 23 illustrate an alternative embodiment in which second clamp 26 does not comprise the bicycle's seat clamp. In particular, first clamp 25 is positioned to clamp around top tube 94 of bicycle 90, whereas second clamp 26, connected to first clamp 25 via an intermediary component 24, is positionable relative to intermediary component 24 such that second clamp 26 may either clamp above seat clamp 93 of bicycle 90, directly to seat tube 91 (FIG. 24), or alternatively below seat clamp 93 of bicycle 90, directly to the bicycle frame (FIG. 23). The benefit of clamping second clamp 26 below seat clamp 93 is that second clamp 26 does not interfere with adjustment of the saddle height, and may therefore be used with dropper seat posts.

Figure 25:
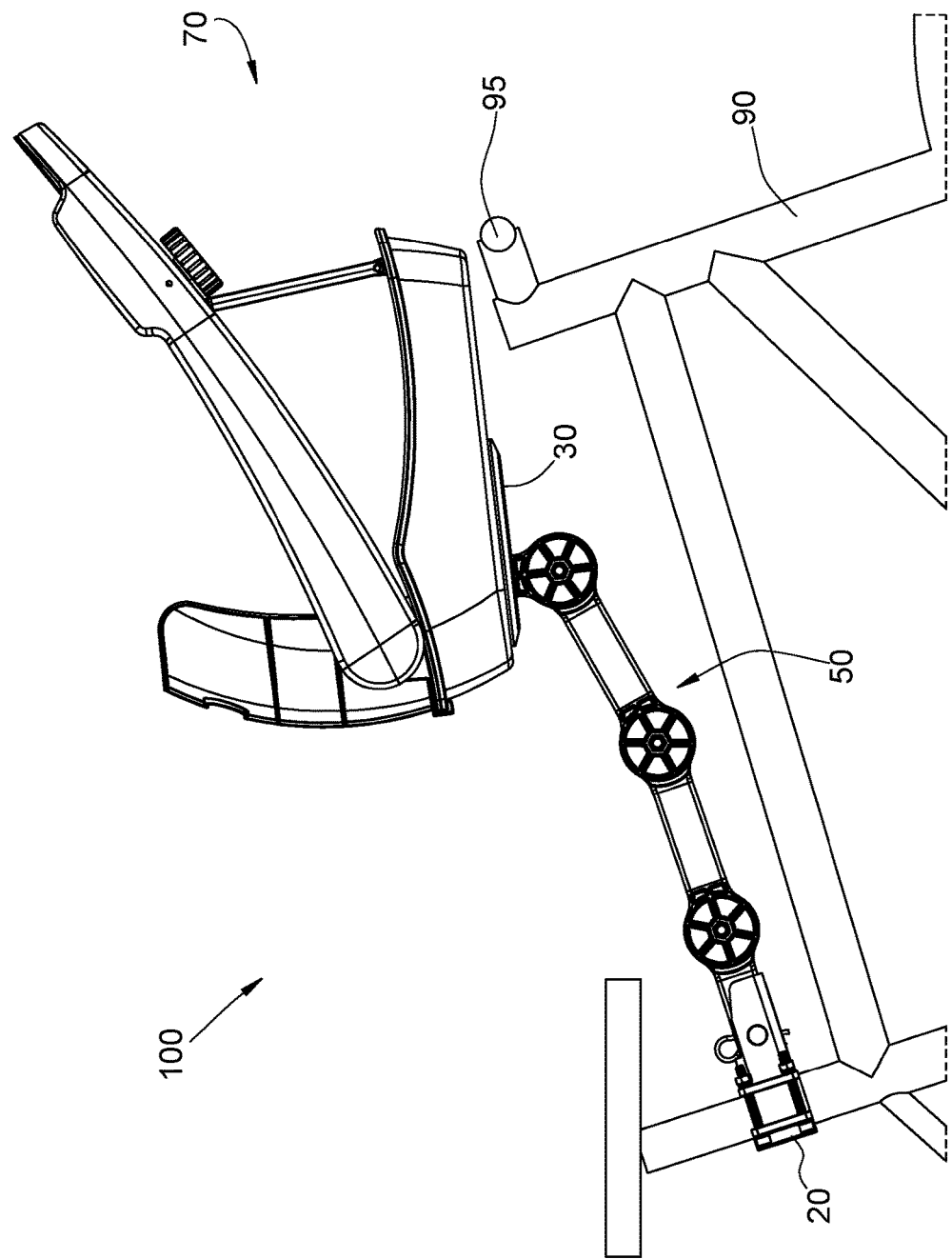
FIGS. 25-27 show the adjustable carrier attachment and animal carrier FIG. 1 in various different positions relative to the bicycle, according to an embodiment of the disclosure.

FIG. 25 shows adjustable carrier attachment 100 secured to bicycle 90, with animal carrier 70 tilted slightly relative to the horizontal in order to adjust the center of gravity of animal carrier 70 and thereby position animal carrier 70 in a more optimum position relative to bicycle 90. According to some embodiments, animal carrier 70 may include, at a front thereof, a recess (not shown) for accommodating at least a portion of the stem of bicycle 90.

Figure 26:
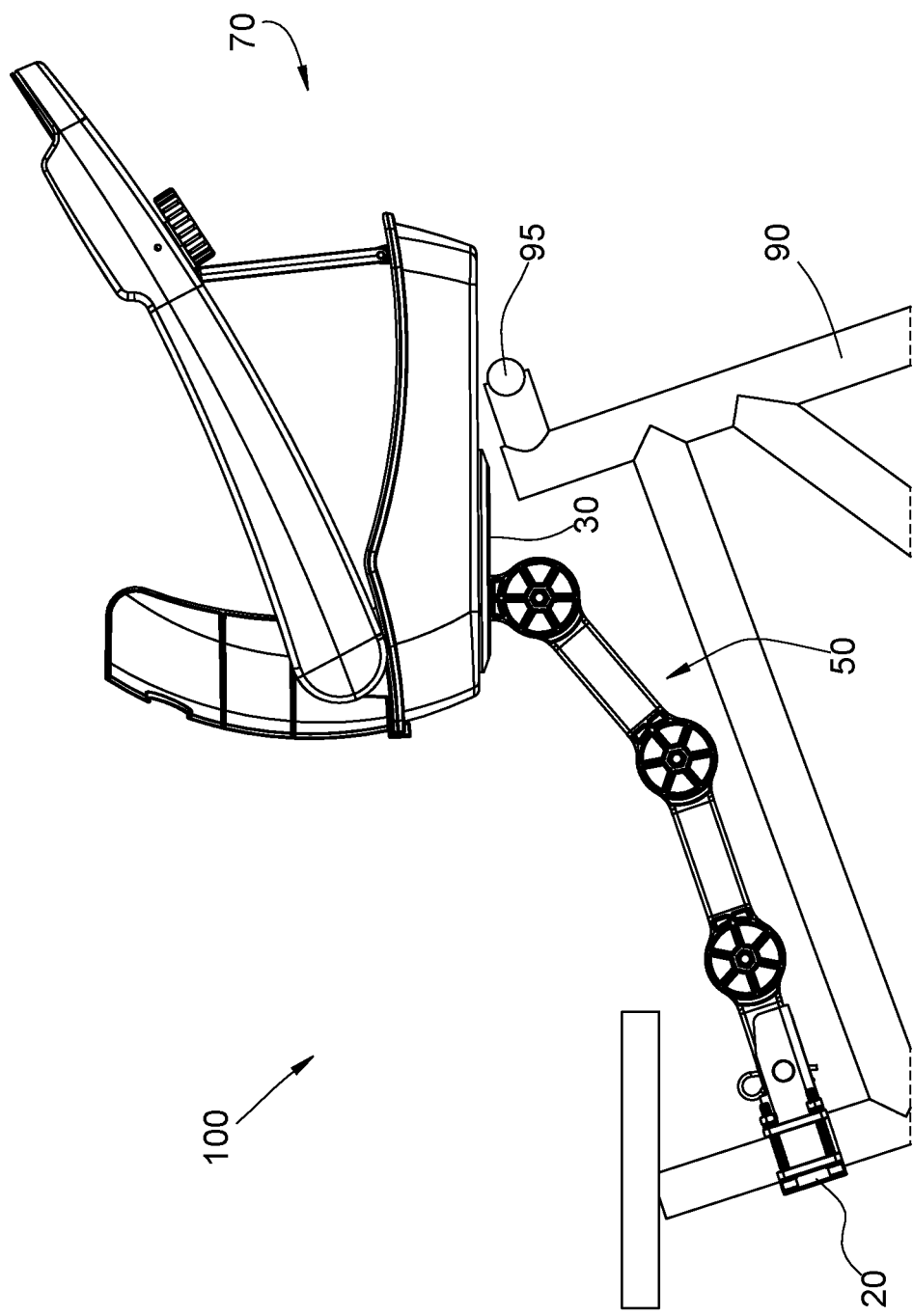

FIG. 26 shows adjustable carrier attachment 100 secured to a relatively smaller bicycle 90. In this embodiment, animal carrier 70 extends partially forward of handlebars 95.

Figure 27:
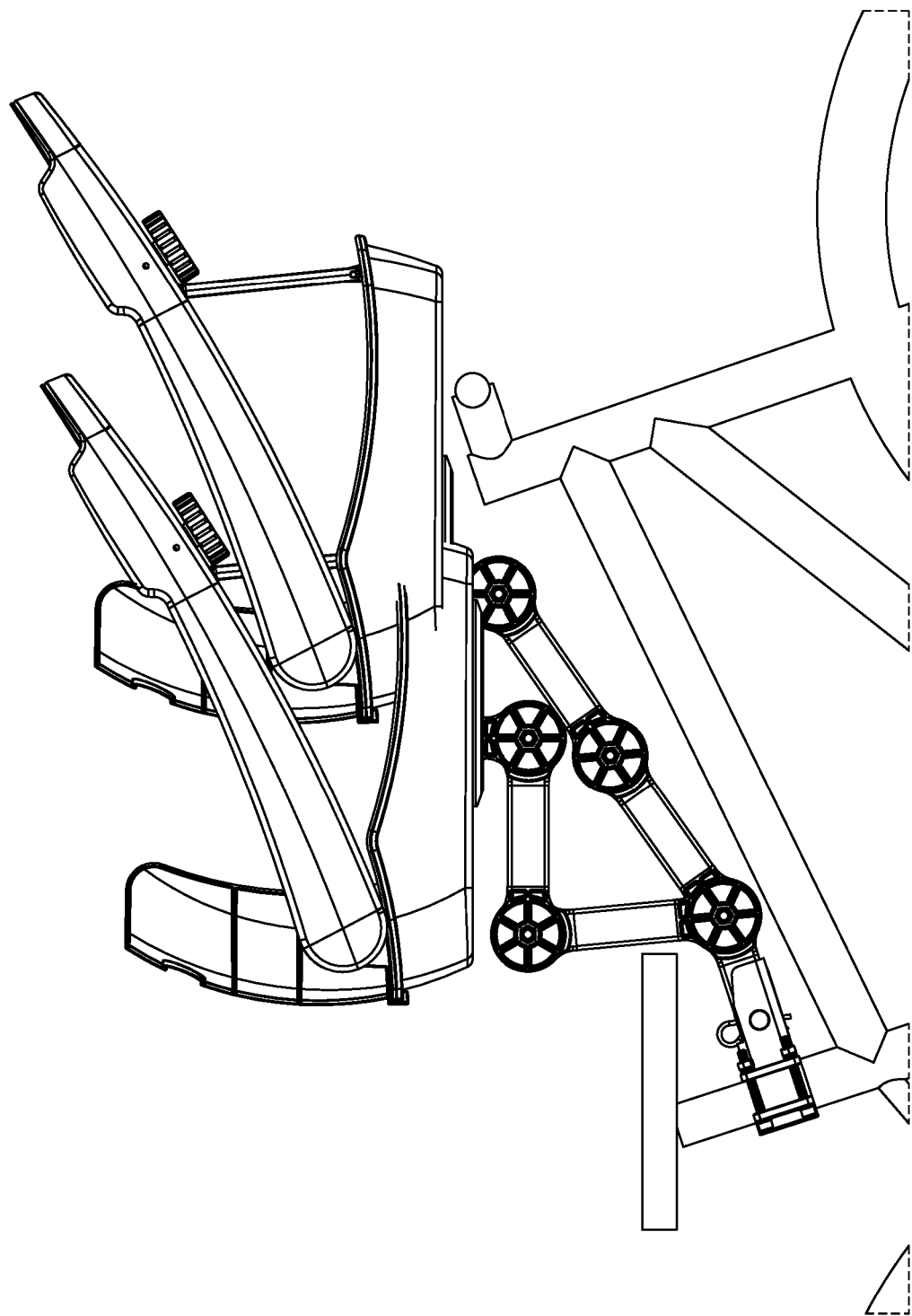

FIG. 27 shows the potential range of adjustability of animal carrier 70 relative to carrier mount 30. As can be seen, in the leftmost position of animal carrier 70, carrier mount 30 is positioned as far forward as possible relative animal carrier 70 without protruding from the front edge of carrier base 72. In contrast, in the rightmost position of animal carrier 70, carrier mount 30 is positioned as far backward as possible relative animal carrier 70 without protruding from the rear edge of carrier base 72.

Figure 28:
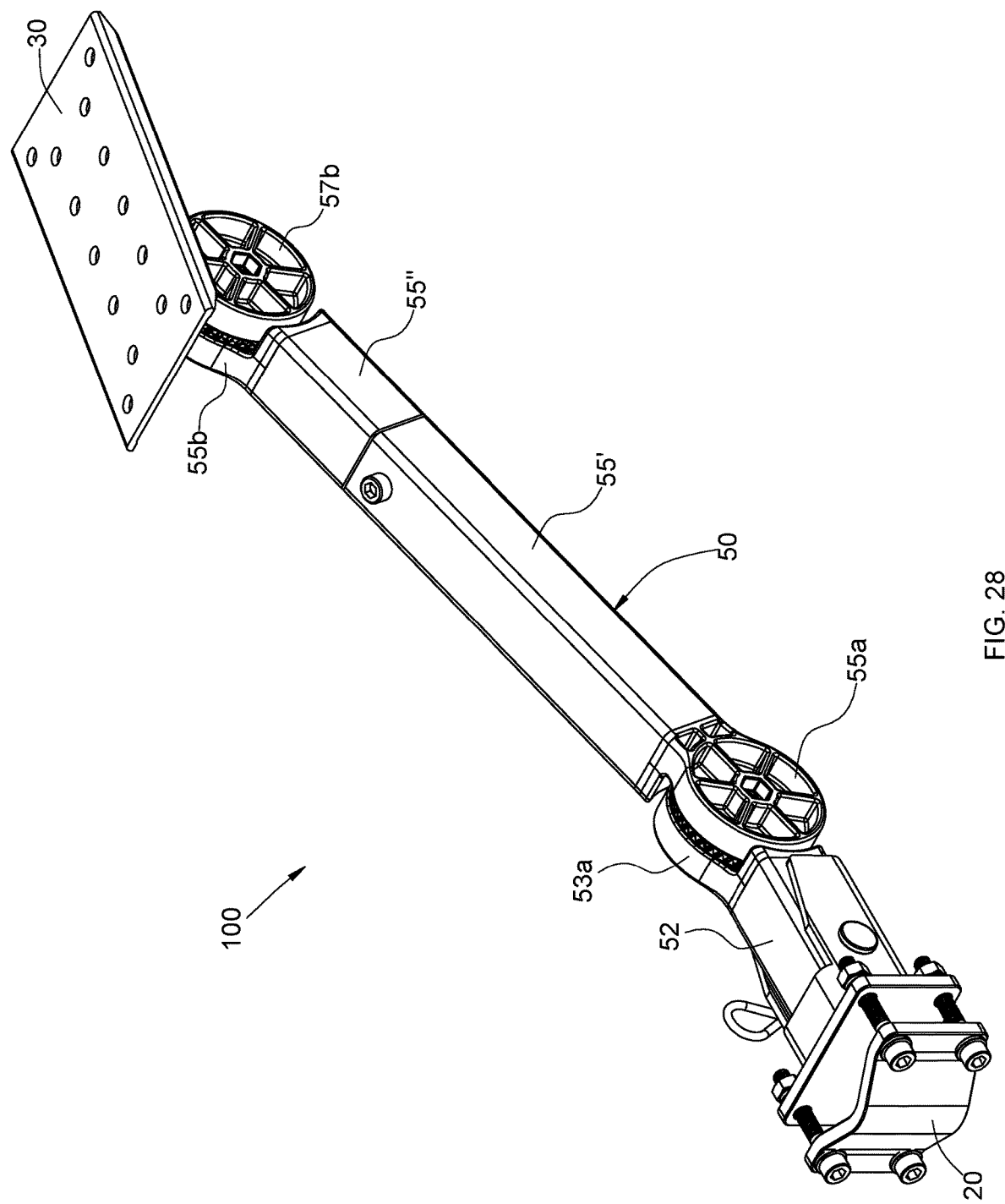
FIGS. 28 and 29 another version of an adjustable carrier attachment, according to an embodiment of the disclosure.
Figure 29:
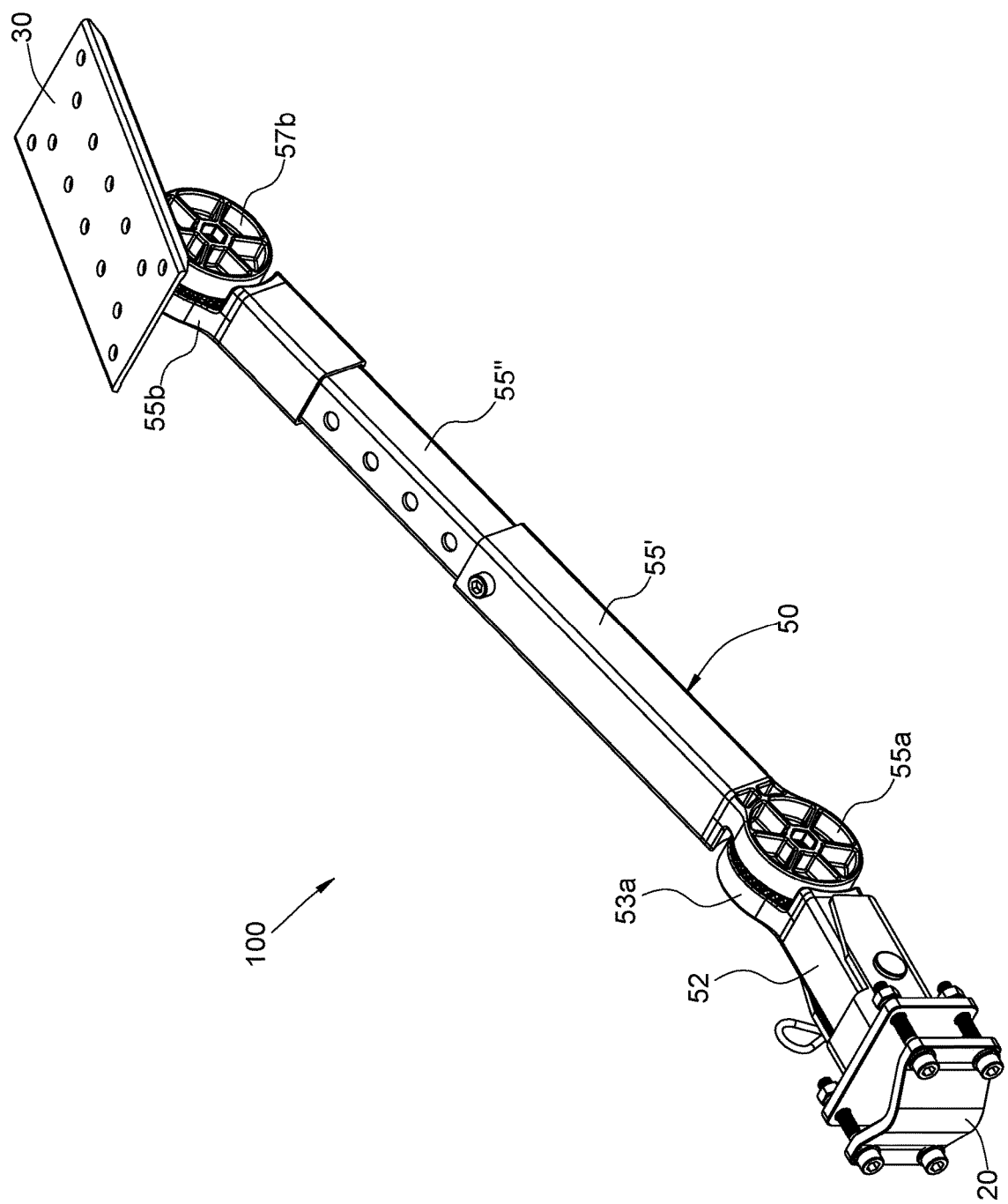

According to some embodiments, even greater extension of adjustable arm 50 may be needed. For example, for particularly short riders, adjustable arm 50 may require added length in order to position animal carrier 70 in the optimal position for riding. To this end, FIGS. 28 and 29 show an embodiment of adjustable carrier attachment 100 in which one of the arm portions is extendable. In particular, the arm portion includes a first telescoping arm portion 55' that may extend or telescope relative to a second telescoping arm portion 55". The degree of extension may be controlled by inserting a fastener through first telescoping arm portion 55' and through any of various apertures formed along the length of second telescoping arm portion 55". It shall be recognized that other arm portions of adjustable arm 50 may be configured to be telescoping or otherwise extendable.

The terms "coupled", "coupling" or "connected" as used herein can have several different meanings depending on the context in which these terms are used. For example, as used herein, the terms coupled, coupling, or connected can indicate that two elements or devices are directly connected to one another or connected to one another through one or more intermediate elements or devices via a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

Use of language such as "at least one of X, Y, and Z," "at least one of X, Y, or Z," "at least one or more of X, Y, and Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. A device for securing to a bicycle, comprising:
    an adjustable arm having a first end and a second end and defining a fore-aft direction, the adjustable arm comprising:
        a bicycle coupling at the first end, for securing the arm to the bicycle; and
        a carrier mount at the second end; and
        an animal carrier comprising a carrier base for mounting to the carrier mount, wherein the arm is adjustable such that the carrier mount is rotatable relative to the bicycle coupling, wherein the animal carrier and the carrier mount are configured such that the animal carrier is adjustably securable to the carrier mount in the fore-aft direction by, when the carrier base is secured to the carrier mount in a first position, detaching the carrier base from the carrier mount, translating the animal carrier relative to the carrier mount in the fore-aft direction, and securing the carrier base to the carrier mount in a second position, and wherein, in the first and second positions, the carrier mount does not protrude beyond edges of the carrier base.

2. The device of claim 1, wherein the arm further comprises interconnected arm portions extending between the first and second ends of the arm, and wherein at least a first arm portion of the arm portions is pivotally connected to at least a second arm portion of the arm portions.

3. The device of claim 2, wherein at least a third arm portion of the arm portions is pivotally connected to the second arm portion.

4. The device of claim 2, wherein the first arm portion is pivotally connected to the second arm portion via interlocking gears.

5. The device of claim 2, wherein at least one of the arm portions comprises a first portion extending in a first direction and a second portion extending in a second direction at a fixed angle relative to the first direction.

6. The device of claim 2, wherein the carrier mount is pivotally connected to one of the arm portions.

7. The device of claim 1, wherein the arm comprises a first arm portion and a second arm portion, each extending between the first and second ends of the arm, and wherein the first arm portion extends in a first direction and the second arm portion extends in a second direction at a fixed angle relative to the first direction.

8. The device of claim 1, wherein the bicycle coupling comprises a clamp for clamping the arm to a seat tube of the bicycle.

9. The device of any claim 1, wherein the bicycle coupling comprises:
a first attachment for attaching the bicycle coupling to a seat tube of the bicycle; and
a second attachment for attaching the bicycle coupling to a top tube of the bicycle.

10. The device of claim 9, wherein the first attachment is positioned relative to the second attachment such that the first attachment is attachable below a seat clamp of the bicycle.

11. The device of claim 9, wherein the first attachment is positioned relative to the second attachment such that the first attachment is attachable above a seat clamp of the bicycle.

12. The device of claim 9, wherein the first attachment comprises a seat clamp of the bicycle.

13. The device of claim 1, wherein the animal carrier comprises at a front thereof a recess for accommodating at least a portion of a stem of the bicycle.

14. The device of claim 1, wherein the carrier base comprises a set of first apertures spaced apart in the fore-aft direction, wherein the carrier mount comprises a set of second apertures spaced apart in the fore-aft direction, and wherein the animal carrier is adjustably securable to the carrier mount in the fore-aft direction by, when the carrier base is secured to the carrier mount in the first position, detaching the carrier base from the carrier mount, translating the animal carrier relative to the carrier mount in the fore-aft direction, aligning at least one of the first apertures with at least one of the second apertures, and inserting a fastener through the aligned apertures to secure the carrier base to the carrier mount in the second position.

15. The device of claim 14, wherein:
adjacent apertures in the set of first apertures are spaced apart in the fore-aft direction by up to 4 inches; or
adjacent apertures in the set of second apertures are spaced apart in the fore-aft direction by up to 4 inches.

16. The device of claim 1, further comprising a secondary arm having a first end and a second end and comprising:
a secondary bicycle coupling at the first end of the secondary arm and configured to secure the secondary arm to the bicycle; and
a secondary carrier mount at the second end of the secondary arm and configured to secure the secondary arm to at least one of: the carrier mount; the animal carrier; and
the adjustable arm.

17. The device of claim 16, wherein the secondary carrier mount at the second end of the secondary arm is configured to secure the secondary arm to the adjustable arm or the animal carrier.

18. The device of claim 16, wherein the secondary bicycle coupling is configured to secure the secondary arm to a top tube or a stem of the bicycle.

19. The device of claim 16, wherein the secondary carrier mount comprises one or more apertures formed therein, and wherein the secondary carrier mount is attachable to the animal carrier by aligning at least one of the one or more apertures with at least one corresponding aperture formed in the animal carrier and inserting a fastener through the aligned apertures.

20. The device of claim 1, wherein the adjustable arm is extendable.

21. A bicycle comprising a device according to claim 1 attached thereto.

22. The device of claim 1,
wherein the animal carrier comprises a wall extending upward from an edge of a horizontal floor of the animal carrier.

23. The device of claim 22, wherein the animal carrier further comprises a paw deck for allowing an animal in the animal carrier to rest their paws on the paw deck.

* * * * *